US012272303B2

(12) United States Patent
Yu et al.

(10) Patent No.: US 12,272,303 B2
(45) Date of Patent: Apr. 8, 2025

(54) DRIVING CIRCUITRY, DRIVING METHOD, DRIVING MODULE, AND DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Ziyang Yu, Beijing (CN); Haijun Qiu, Beijing (CN); Ming Hu, Beijing (CN); Zhiliang Jiang, Beijing (CN); Tianyi Cheng, Beijing (CN); Jianpeng Wu, Beijing (CN); Mengqi Wang, Beijing (CN); Qi Wei, Beijing (CN); Wenbo Chen, Beijing (CN); Tiaomei Zhang, Beijing (CN); Sifei Ai, Beijing (CN); Cong Liu, Beijing (CN); Qian Xu, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/294,003

(22) PCT Filed: May 23, 2023

(86) PCT No.: PCT/CN2023/095760

§ 371 (c)(1),
(2) Date: Jan. 31, 2024

(87) PCT Pub. No.: WO2024/239228

PCT Pub. Date: Nov. 28, 2024

(65) Prior Publication Data

US 2025/0078740 A1 Mar. 6, 2025

(51) Int. Cl.
*G09G 3/3225* (2016.01)

(52) U.S. Cl.
CPC ... *G09G 3/3225* (2013.01); *G09G 2300/0819* (2013.01); *G09G 2300/0842* (2013.01);
(Continued)

(58) Field of Classification Search
CPC .......... G09G 3/3677; G09G 3/36; G09G 3/20; G09G 3/32; G09G 3/18; G09G 3/3266;
(Continued)

(56) References Cited

U.S. PATENT DOCUMENTS

2001/0022572 A1* 9/2001 Murade ................ G09G 3/3648 345/98
2004/0021650 A1* 2/2004 Yamashita ........... G09G 3/3677 345/204

(Continued)

*Primary Examiner* — Dong Hui Liang
(74) *Attorney, Agent, or Firm* — Muncy, Geissler, Olds & Lowe, P.C.

(57) ABSTRACT

The present disclosure provides a driving circuitry, a driving method, a driving module, and a display device. The driving circuitry includes a driving signal generation circuitry, a gating circuitry, an output control circuitry and an output circuitry. The driving signal generation circuitry is configured to perform a shifting operation on an $(N-1)^{th}$-level driving signal to obtain an $N^{th}$-level driving signal. The gating circuitry is configured to write a gating input signal into a first node under the control of a gating control signal. The output control circuitry is configured to perform an NAND operation on the $N^{th}$-level driving signal and a potential at a second end of the output control circuitry to obtain a first output signal. The output circuitry is configured to perform phase inversion on the first output signal to obtain and provide an output driving signal through an output driving end, where N is a positive integer.

20 Claims, 16 Drawing Sheets

(52) U.S. Cl.
CPC ............... *G09G 2320/0247* (2013.01); *G09G 2330/021* (2013.01)

(58) Field of Classification Search
CPC .. G09G 3/3648; G09G 3/3225; G09G 3/3688; G09G 3/006; G09G 3/3622; G09G 3/3625; G09G 3/3692; G09G 3/3681; G09G 3/3208; G09G 3/3233; G09G 2310/0286; G09G 2310/08; G09G 2310/04; G09G 2310/0262; G09G 2310/027; G09G 2310/0205; G09G 2360/18; G09G 2320/103; G09G 2300/0842; G09G 2300/0857; G09G 2300/0814; G09G 2300/0426
See application file for complete search history.

(56) References Cited

U.S. PATENT DOCUMENTS

2011/0205196 A1* 8/2011 Okuno ................. G09G 3/3674 345/204
2016/0351112 A1* 12/2016 Qing ........................ G09G 3/20

* cited by examiner

DRIVING CIRCUITRY, DRIVING METHOD, DRIVING MODULE, AND DISPLAY DEVICE

CROSS REFERENCE TO RELATED APPLICATIONS

This application is the U.S. national phase of PCT Application No. PCT/CN2023/095760 filed on May 23, 2023, which is incorporated herein by reference in its entirety.

TECHNICAL FIELD

The present disclosure relates to the field of display technology, in particular to a driving circuitry, a driving method, a driving module and a display device.

BACKGROUND

In the related art, when an image is updated by an organic light-emitting diode (OLED) display device, it is necessary to initialize and write pixel voltages for pixel circuitries in all rows within one frame. However, for some special images (such as an Always On Display (AOD) image (i.e., an image on a screen of a mobile phone which is partially lightened), a static image or an image with few updates), the pixel voltage does not need to be updated for most of the pixel circuitries, that is, most of the pixel circuitries are maintained at an original display brightness value through a low-leakage low-temperature polycrystalline oxide (LTPO) thin film transistor (TFT). When the pixel voltages of these pixel circuitries are initialized and written repeatedly, a waste of power consumption occurs.

SUMMARY

In one aspect, the present disclosure provides in some embodiments a driving circuitry, including a driving signal generation circuitry, a gating circuitry, an output control circuitry and an output circuitry. The driving signal generation circuitry is electrically coupled to an $(N-1)^{th}$-level driving signal output end and an $N^{th}$-level driving signal output end and configured to perform a shifting operation on an $(N-1)^{th}$-level driving signal from the $(N-1)^{th}$-level driving signal output end to obtain and output an $N^{th}$-level driving signal through the $N^{th}$-level driving signal output end. The gating circuitry is electrically coupled to a first node, a gating input end and a gating control end, and configured to write a gating input signal from the gating input end into the first node under the control of a gating control signal from the gating control end. A first end of the output control circuitry is electrically coupled to the $N^{th}$-level driving signal output end, a second end of the output control circuitry is electrically coupled to the first node, and the output control circuitry is configured to perform an NAND operation on the $N^{th}$-level driving signal and a potential at the second end of the output control circuitry to obtain a first output signal. The output circuitry is configured to perform phase inversion on the first output signal to obtain and provide an output driving signal through an output driving end, where N is a positive integer.

In a possible embodiment of the present disclosure, the gating circuitry is configured to write the gating input signal from the gating input end into the first node when a potential of the $(N-1)^{th}$-level driving signal is a first voltage and a potential of the $N^{th}$-level driving signal is a second voltage.

In a possible embodiment of the present disclosure, the gating circuitry includes a first transistor, a gate electrode of the first transistor is electrically coupled to the gating control end, a first electrode of the first transistor is electrically coupled to the first node, and a second electrode of the first transistor is electrically coupled to the gating input end.

In a possible embodiment of the present disclosure, the gating control end includes a first gating control end and a second gating control end, the gating circuitry includes a first transistor and a second transistor, a gate electrode of the first transistor is electrically coupled to the first gating control end, a first electrode of the first transistor is electrically coupled to the first node, a second electrode of the first transistor is electrically coupled to a first electrode of the second transistor, a gate electrode of the second transistor is electrically coupled to the second gating control end, and a second electrode of the second transistor is electrically coupled to the gating input end. The first gating control end is the $(N-1)^{th}$-level driving signal output end, the second gating control end is the $N^{th}$-level driving signal output end, the first transistor is an n-type transistor, and the second transistor is a p-type transistor: or the first gating control end is the $N^{th}$-level driving signal output end, the second gating control end is the $(N-1)^{th}$-level driving signal output end, the first transistor is the p-type transistor, and the second transistor is the n-type transistor: or the first gating control end is configured to receive a signal having a phase inverse to the $(N-1)^{th}$-level driving signal, the second gating control end is the $N^{th}$-level driving signal output end, and the first transistor and the second transistor are both p-type transistors: or the first gating control end is the $N^{th}$-level driving signal output end, and the second gating control end is configured to receive a signal having a phase inverse to the $(N-1)^{th}$-level driving signal, and the first transistor and the second transistor are both p-type transistors: or the first gating control end is an $(N-1)^{th}$-level driving signal end, the second gating control end is configured to receive a signal having a phase inverse to the $N^{th}$-level driving signal, and the first transistor and the second transistor are both n-type transistors: or the first gating control end is configured to receive a signal having a phase inverse to the $N^{th}$-level driving signal, the second gating control end is the $(N-1)^{th}$-level driving signal end, and the first transistor and the second transistor are both n-type transistors.

In a possible embodiment of the present disclosure, the driving circuitry further includes a first initialization circuitry electrically coupled to an initial control end, a first voltage end and the first node, and configured to control the first node to be electrically coupled to the first voltage end under the control of an initial control signal from the initial control end.

In a possible embodiment of the present disclosure, the driving circuitry further includes a first voltage maintenance circuitry, a first end of the first voltage maintenance circuitry is electrically coupled to the first node, a second end of the first voltage maintenance circuitry is electrically coupled to a direct current voltage end or a second node, and the first voltage maintenance circuitry is configured to maintain a potential at the first node.

In a possible embodiment of the present disclosure, the driving circuitry further includes a second voltage maintenance circuitry, the first node is electrically coupled to the second end of the output control circuitry through the second voltage maintenance circuitry, the second voltage maintenance circuitry includes a first phase inverter, a second phase inverter and a maintenance control circuitry, an input end of the first phase inverter is electrically coupled to the first node, an output end of the first phase inverter is electrically coupled to the second node, an input end of the second phase inverter is electrically coupled to the second node, an output end of the second phase inverter is electrically coupled to a third node and the second end of the output control circuitry, the first phase inverter is configured to perform phase inversion on the potential at the first node and output an inverted potential through the output end of the first phase inverter, the second phase inverter is configured to perform phase inversion on a potential at the input end of the second phase inverter and output an inverted potential through the output end of the second phase inverter, and the maintenance control circuitry is electrically coupled to a maintenance control end, the third node and the first node, and configured to control the third node to be electrically coupled to, or electrically decoupled from, the first node under the control of a maintenance control signal from the maintenance control end.

In a possible embodiment of the present disclosure, the maintenance control end includes a first maintenance control end and a second maintenance control end, the maintenance control circuitry includes a third transistor and a fourth transistor, a gate electrode of the third transistor is electrically coupled to the first maintenance control end, a first electrode of the third transistor is electrically coupled to the first node, a second electrode of the third transistor is electrically coupled to the third node, a gate electrode of the fourth transistor is electrically coupled to the second maintenance control end, a first electrode of the fourth transistor is electrically coupled to the third node, a second electrode of the fourth transistor is electrically coupled to the first node, the third transistor is a p-type transistor, the fourth transistor is an n-type transistor, and the first maintenance control end is the $(N-1)^{th}$-level driving signal end and the second maintenance control end is a first clock signal end, or the first maintenance control end is a second clock signal end and the second maintenance control end is the first clock signal end.

In a possible embodiment of the present disclosure, the first phase inverter includes a fifth transistor and a sixth transistor, the second phase inverter includes a seventh transistor and an eighth transistor, a gate electrode of the fifth transistor is electrically coupled to the first node, a first electrode of the fifth transistor is electrically coupled to the first voltage end, a second electrode of the fifth transistor is electrically coupled to the second node, a gate electrode of the sixth transistor is electrically coupled to the first node, a first electrode of the sixth transistor is electrically coupled to the second node, a second electrode of the sixth transistor is electrically coupled to a second voltage end, the fifth transistor is a p-type transistor, the sixth transistor is an n-type transistor, a gate electrode of the seventh transistor is electrically coupled to the second node, a first electrode of the seventh transistor is electrically coupled to the first voltage end, a second electrode of the seventh transistor is electrically coupled to a third node, a gate electrode of the eighth transistor is electrically coupled to the second node, a first electrode of the eighth transistor is electrically coupled to the third node, a second electrode of the eighth transistor is electrically coupled to the second voltage end, the seventh transistor is a p-type transistor, and the eighth transistor is an n-type transistor.

In a possible embodiment of the present disclosure, the first initialization circuitry includes a ninth transistor, the first voltage maintenance circuitry includes a first capacitor, a gate electrode of the ninth transistor is electrically coupled to the initial control end, a first electrode of the ninth transistor is electrically coupled to the first voltage end, a second electrode of the ninth transistor is electrically coupled to the first node, a first end of the first capacitor is electrically coupled to the first node, and a second end of the first capacitor is electrically coupled to the direct current voltage end or the second node.

In a possible embodiment of the present disclosure, the output control circuitry includes a tenth transistor, an eleventh transistor, a twelfth transistor and a thirteenth transistor, a gate electrode of the tenth transistor is electrically coupled to the $N^{th}$-level driving signal output end, a first electrode of the tenth transistor is electrically coupled to the first voltage end, a second electrode of the tenth transistor is electrically coupled to a fourth node, a gate electrode of the eleventh transistor is electrically coupled to the first node, a first electrode of the eleventh transistor is electrically coupled to the first voltage end, a second electrode of the eleventh transistor is electrically coupled to the fourth node, a gate electrode of the twelfth transistor is electrically coupled to the $N^{th}$-level driving signal output end, a first electrode of the twelfth transistor is electrically coupled to the fourth node, a second electrode of the twelfth transistor is electrically coupled to a fifth node, a gate electrode of the thirteenth transistor is electrically coupled to the first node, a first electrode of the thirteenth transistor is electrically coupled to the fifth node, a second electrode of the thirteenth transistor is electrically coupled to the second voltage end, the tenth transistor and the eleventh transistor are p-type transistors, and the twelfth transistor and the thirteenth transistor are n-type transistors.

In a possible embodiment of the present disclosure, the output control circuitry includes a tenth transistor, an eleventh transistor, a twelfth transistor and a thirteenth transistor, a gate electrode of the tenth transistor is electrically coupled to the $N^{th}$-level driving signal output end, a first electrode of the tenth transistor is electrically coupled to the first voltage end, a second electrode of the tenth transistor is electrically coupled to a fourth node, a gate electrode of the eleventh transistor is electrically coupled to the third node, a first electrode of the eleventh transistor is electrically coupled to the first voltage end, a second electrode of the eleventh transistor is electrically coupled to the fourth node, a gate electrode of the twelfth transistor is electrically coupled to the $N^{th}$-level driving signal output end, a first electrode of the twelfth transistor is electrically coupled to the fourth node, a second electrode of the twelfth transistor is electrically coupled to a fifth node, a gate electrode of the thirteenth transistor is electrically coupled to the third node, a first electrode of the thirteenth transistor is electrically coupled to the fifth node, a second electrode of the thirteenth transistor is electrically coupled to the second voltage end, the tenth transistor and the eleventh transistor are p-type transistors, and the twelfth transistor and the thirteenth transistor are n-type transistors.

In a possible embodiment of the present disclosure, the output circuitry includes a fourteenth transistor and a fifteenth transistor, a gate electrode of the fourteenth transistor is electrically coupled to a fourth node, a first electrode of the fourteenth transistor is electrically coupled to the first voltage end, a second electrode of the fourteenth transistor is electrically coupled to the output driving end, a gate electrode of the fifteenth transistor is electrically coupled to the fourth node, a first electrode of the fifteenth transistor is electrically coupled to the output driving end, and a second electrode of the fifteenth transistor is electrically coupled to the second voltage end.

In a possible embodiment of the present disclosure, the driving signal generation circuitry includes a first control circuitry, a second control circuitry, a third phase inverter and a second initialization circuitry, the first control circuitry is electrically coupled to a first clock signal end, a second clock signal end, the $(N-1)^{th}$-level driving signal output end, and a sixth node, and configured to perform a shifting operation and phase inversion on the $(N-1)^{th}$-level driving signal from the $(N-1)^{th}$-level driving signal output end under the control of a first clock signal from the first clock signal end and a second clock signal from the second clock signal end to obtain and output an inverted signal through the sixth node, the second control circuitry is electrically coupled to the first clock signal end, the second clock signal end, the $N^{th}$-level driving signal output end and the sixth node, and configured to perform phase inversion on the $N^{th}$-level driving signal from the $N^{th}$-level driving signal output end under the control of the first clock signal and the second clock signal to obtain and output an inverted signal through the sixth node, the third phase inverter is electrically coupled to the sixth node and the $N^{th}$-level driving signal output end, and configured to perform phase inversion on a potential at the sixth node and output an inverted signal through the $N^{th}$-level driving signal output end, and the second initialization circuitry is electrically coupled to the initial control end, the first voltage end and the $N^{th}$-level driving signal output end, and configured to control the $N^{th}$-level driving signal output end to be electrically coupled to the first voltage end under the control of the initial control signal from the initial control end.

In a possible embodiment of the present disclosure, the first control circuitry includes a sixteenth transistor, a seventeenth transistor, an eighteenth transistor and a nineteenth transistor, a gate electrode of the sixteenth transistor is electrically coupled to the second clock signal end, a first electrode of the sixteenth transistor is electrically coupled to the first voltage end, a second electrode of the sixteenth transistor is electrically coupled to a first electrode of the seventeenth transistor, a gate electrode of the seventeenth transistor is electrically coupled to the $(N-1)^{th}$-level driving signal output end, a second electrode of the seventeenth transistor is electrically coupled to the sixth node, a gate electrode of the eighteenth transistor is electrically coupled to the $(N-1)^{th}$-level driving signal output end, a first electrode of the eighteenth transistor is electrically coupled to the sixth node, a second electrode of the eighteenth transistor is electrically coupled to a first electrode of the nineteenth transistor, a gate electrode of the nineteenth transistor is electrically coupled to the first clock signal end, a second electrode of the nineteenth transistor is electrically coupled to the second voltage end, the sixteenth transistor and the seventeenth transistor are p-type transistors, and the eighteenth transistor and the nineteenth transistor are n-type transistors.

In a possible embodiment of the present disclosure, the second control circuitry includes a twentieth transistor, a twenty-first transistor, a twenty-second transistor and a twenty-third transistor, a gate electrode of the twentieth transistor is electrically coupled to the first clock signal end, a first electrode of the twentieth transistor is electrically coupled to the first voltage end, a second electrode of the twentieth transistor is electrically coupled to a first electrode of the twenty-first transistor, a gate electrode of the twenty-first transistor is electrically coupled to the $N^{th}$-level driving signal output end, a second electrode of the twenty-first transistor is electrically coupled to the sixth node, a gate electrode of the twenty-second transistor is electrically coupled to the $N^{th}$-level driving signal output end, a first electrode of the twenty-second transistor is electrically coupled to the sixth node, a second electrode of the twenty-second transistor is electrically coupled to a first electrode of the twenty-third transistor, a gate electrode of the twenty-third transistor is electrically coupled to the second clock signal end, a second electrode of the twenty-third transistor is electrically coupled to the second voltage end, the twentieth transistor and the twenty-first transistor are p-type transistors, and the twenty-second transistor and the twenty-third transistor are the n-type transistors.

In a possible embodiment of the present disclosure, the third phase inverter includes a twenty-fourth transistor and a twenty-fifth transistor, the second initialization circuitry includes a twenty-sixth transistor, a gate electrode of the twenty-fourth transistor is electrically coupled to the sixth node, a first electrode of the twenty-fourth transistor is electrically coupled to the first voltage end, a second electrode of the twenty-fourth transistor is electrically coupled to a first electrode of the twenty-fifth transistor, a gate electrode of the twenty-fifth transistor is electrically coupled to the sixth node, a second electrode of the twenty-fifth transistor is electrically coupled to a second voltage end, the twenty-fourth transistor is a p-type transistor, the twenty-fifth transistor is an n-type transistor, a gate electrode of the twenty-sixth transistor is electrically coupled to the initial control end, a first electrode of the twenty-sixth transistor is electrically coupled to the first voltage end, and a second electrode of the twenty-sixth transistor is electrically coupled to the $N^{th}$-level driving signal output end.

In another aspect, the present disclosure provides in some embodiments a driving method for the above-mentioned driving circuitry, including: performing, by the driving signal generation circuitry, a shifting operation on an $(N-1)^{th}$-level driving signal to obtain and output an $N^{th}$-level driving signal through the $N^{th}$-level driving signal output end: writing, by the gating circuitry, a gating input signal from the gating input end into the first node under the control of a gating control signal: performing, by the output control circuitry, an NAND operation on the $N^{th}$-level driving signal and a potential at the second end of the output control circuitry to obtain a first output signal; and performing, by the output circuitry, phase inversion on the first output signal to obtain and provide an output driving signal through the output driving end.

In yet another aspect, the present disclosure provides in some embodiments a driving module including multiple levels of the above-mentioned driving circuitries. An $N^{th}$-level driving circuitry is electrically coupled to a driving signal output end of an $(N-1)^{th}$-level driving circuitry, where N is a positive integer.

In still yet another aspect, the present disclosure provides in some embodiments a display device including the above-mentioned driving module.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

All transistors adopted in the embodiments of the present disclosure may be TFTs, field effect transistors (FETs) or any other elements having an identical characteristic. In order to differentiate two electrodes other than a gate electrode from each other, one of the two electrodes is called as first electrode and the other is called as second electrode.

In actual use, when the transistor is a TFT or an FET, the first electrode may be a drain electrode while the second electrode may be a source electrode, or the first electrode may be a source electrode while the second electrode may be a drain electrode.

Figure 1:
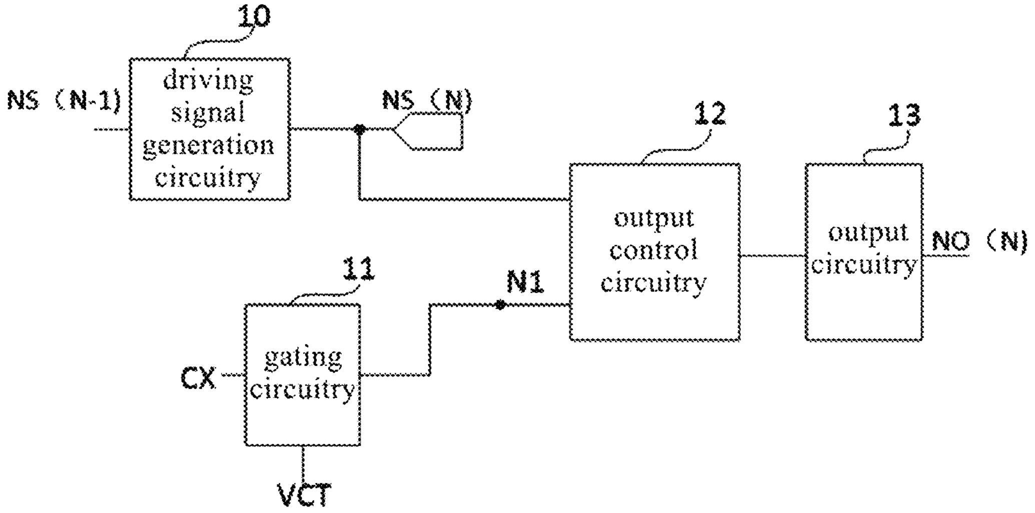
FIG. 1 is a schematic view showing a driving circuitry according to one embodiment of the present disclosure.

As shown in FIG. 1, the present disclosure provides in some embodiments a driving circuitry, which includes a driving signal generation circuitry 10, a gating circuitry 11, an output control circuitry 12 and an output circuitry 13.

The driving signal generation circuitry 10 is electrically coupled to an $(N-1)^{th}$-level driving signal output end NS (N−1) and an $N^{th}$-level driving signal output end NS (N), and configured to perform a shifting operation on an $(N-1)^{th}$-level driving signal from the $(N-1)^{th}$-level driving signal output end NS (N−1) to obtain and output an $N^{th}$-level driving signal via the $N^{th}$-level driving signal output end NS (N).

The gating circuitry 11 is electrically coupled to a first node N1, a gating input end VCT and a gating control end CX, and configured to write a gating input signal from the gating input end VCT into the first node N1 under the control of a gating control signal from the gating control end CX.

A first end of the output control circuitry 12 is electrically coupled to the NS (N) of the $N^{th}$-level driving signal output end, a second end of the output control circuitry 12 is electrically coupled to the first node N1, and the output control circuitry 12 is configured to perform an NAND operation on the $N^{th}$-level driving signal and a potential at the second end of the output control circuitry to obtain a first output signal.

The output circuitry 13 is electrically coupled to the output control circuitry 12 and an output driving end NO (N), and configured to perform phase inversion on the first output signal to obtain and provide an output driving signal through the output driving end NO (N). N is a positive integer.

During the operation of the driving circuitry in FIG. 1, the driving signal generation circuitry 10 performs the shifting operation on the $(N-1)^{th}$-level driving signal from the $(N-1)^{th}$-level driving signal output end NS (N−1) to obtain and output the $N^{th}$-level driving signal through the $N^{th}$-level driving signal output end NS (N). The gating circuitry 11 writes the gating input signal into the first node N1 under the control of the gating control signal. The output control circuitry 12 performs the NAND operation on the $N^{th}$-level driving signal and the potential at the second end of the output control circuitry 12 to obtain the first output signal. The output circuitry 13 performs the phase inversion on the first output signal to obtain and provide the output driving signal through the output driving end NO (N).

The driving circuitry in FIG. 1 may be an $N^{th}$-level driving circuitry.

During the operation of the driving circuitry in FIG. 1, within one frame, before a stage where the $N^{th}$-level driving signal is provided, the gating circuitry 11 writes the gating input signal from the gating input end VCT into the first node N1 under the control of the gating control signal. When the gating input signal is a high voltage signal, at the stage where the $N^{th}$-level driving signal is provided, the $N^{th}$-level driving signal output end NS (N) outputs a high voltage signal, so the first output signal outputted by the output control circuitry 12 is a low voltage signal. The output circuitry 13 provides a high voltage signal through the output driving end NO (N), so as to update a pixel voltage applied to pixel circuitries in a corresponding row. When the gating input signal is a low voltage signal, at the stage where the $N^{th}$-level driving signal is provided, the $N^{th}$-level driving signal output end NS (N) outputs a high voltage signal, so the first output signal outputted by the output control circuitry 12 is a high voltage signal. The output circuitry 13 provides a low voltage signal through the output driving end NO (N), so as not to update the pixel voltage applied to the pixel circuitries in a corresponding row.

According to the embodiments of the present disclosure, through controlling the gating input signal from the gating input end VCT, it is able to topically update an image on a display screen, thereby to reduce the power consumption. Alternatively, through topically updating an image on the display screen, it is able to remarkably reduce the power consumption of an OLED display product, e.g., a wearable device, a mobile terminal or a notebook computer.

Figure 2:
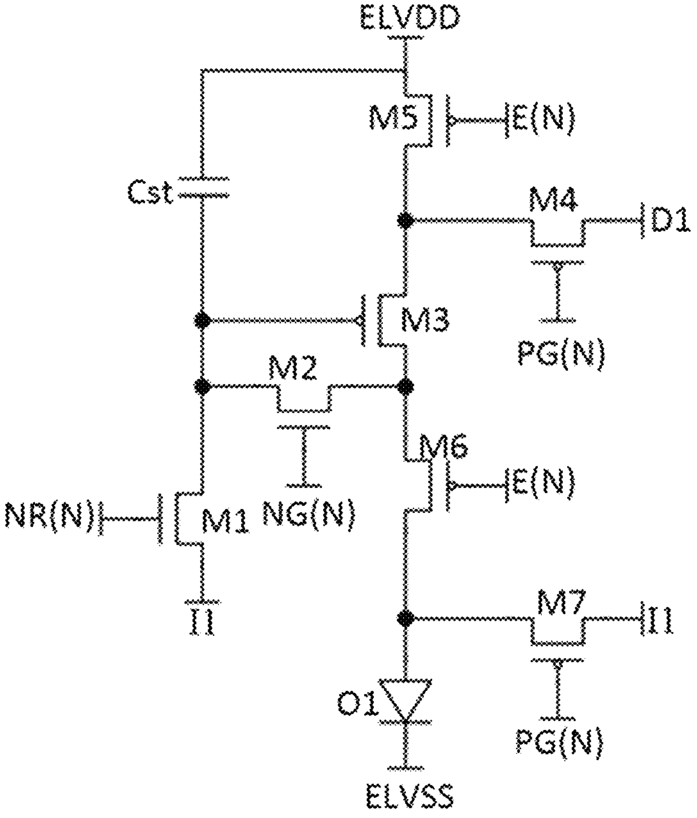
FIG. 2 is a circuit diagram of a pixel circuitry in the related art.

As shown in FIG. 2, in the related art, a pixel circuitry includes a first display control transistor M1, a second display control transistor M2, a driving transistor M3, a fourth display control transistor M4, a fifth display control transistor M5, a sixth display control transistor M6, a seventh display control transistor M7, a storage capacitor Cst, and an organic light-emitting diode O1.

A gate electrode of M1 is electrically coupled to a first resetting end NR (N), a source electrode of M1 is electrically coupled to an initial voltage end I1, and a drain electrode of M1 is electrically coupled to a gate electrode of M3. A gate electrode of M2 is electrically coupled to a first scanning end NG (N), a source electrode of M2 is electrically coupled to the gate electrode of M3, and a drain electrode of M2 is electrically coupled to a drain electrode of M3. A gate electrode of M4 is electrically coupled to a second scanning end PG (N), a source electrode of M4 is electrically coupled to a data line D1, and a drain electrode of M4 is electrically coupled to a source electrode of M3. A gate electrode of M5 is electrically coupled to a light-emission control end E (N), a source electrode of M5 is electrically coupled to a power source voltage end ELVDD, and a drain electrode of M5 is electrically coupled to the source electrode of M3. A gate electrode of M6 is electrically coupled to the light-emission control end E (N), a source electrode of M6 is electrically coupled to the drain electrode of M3, a drain electrode of M6 is electrically coupled to an anode of O1, and a cathode of O1 is electrically coupled to a low level end ELVSS. A gate electrode of M7 is electrically coupled to the second scanning end PG (N), a source electrode of M7 is electrically coupled to the initial voltage end I1, and a drain electrode of M7 is electrically coupled to the anode of O1.

During the implementation, the first resetting end NR (N) is, but not limited to, an $(N-1)^{th}$-level first scanning end NG (N).

In the pixel circuitry in FIG. 2, M1 and M2 are n-type transistors, M3, M4, M5, M6 and M7 are p-type transistors, M1 and M2 are Indium Gallium Zinc Oxide (IGZO) TFTs with a small leakage current, and M3, M4, M5, M6 and M7 are LTPS TFTs.

In the pixel circuitry in FIG. 2, M1 and M2 are IGZO TFTs. In the case of a low frequency, through the IGZO TFT, it is able to maintain a voltage at the gate electrode of M3 through Cst within a long time period.

In the pixel circuitry in FIG. 2, the second scanning end PG (N) is used to reset a voltage applied to the anode of O1 and write a data voltage from the data line into the source electrode of the driving transistor, and the first scanning end NG (N) is used to reset Cst, extract Vth (a threshold voltage of the driving transistor) and write the data voltage into the gate electrode of the driving transistor.

During the implementation, the first scanning signal from the first scanning end NG (N) has, but not limited to, a phase inverse to the second scanning signal from the second scanning end PG (N).

The driving circuitry provides the first scanning signal to the first scanning end NG (N) through, but not limited to, the output driving end NO (N).

Figure 3:
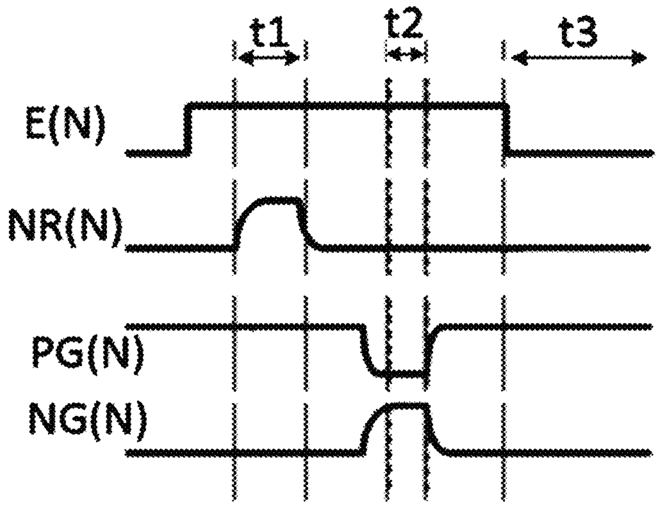
FIG. 3 is a sequence diagram of the pixel circuitry in FIG. 2.

As shown in FIG. 3, during the operation of the pixel circuitry in FIG. 2, a display period includes a first display control stage t1, a second display control stage t2 and a third display control stage t3 arranged sequentially.

At the first display control stage t1, E (N) outputs a high voltage signal, NR (N) provides a high voltage signal, PG (N) provides a high voltage signal, and NG (N) provides a low voltage signal, so as to turn off M5 and M6, and turn on M1. At this time, a potential at the gate electrode of M3 is pulled down to an initial voltage Vinit. The initial voltage end I1 is used to provide the initial voltage Vinit.

At the second display control stage t2, E (N) outputs a high voltage signal, NR (N) provides a low voltage signal, PG (N) provides a low voltage signal, and NG (N) provides a high voltage signal, so as to turn off M5, M6 and M1, and turn on M2 and M4. At this time, M2 and M3 form a diode structure, and Cst is charged through a data voltage Vdata from the data line DI until M3 is turned off. At this time, a voltage on the gate electrode of M3 is Vdata+Vth, where Vth is a threshold voltage of M3. M7 is turned on, so as to reset the voltage on the anode of O1.

At the third display control stage t3, E (N) outputs a low voltage signal, NR (N) provides a low voltage signal, PG (N) provides a high voltage signal, and NG (N) provides a low voltage signal, so as to turn on M5 and M6. M3 drives O1 to emit light. O1 emits light in accordance with Vdata.

Based on the operation of the conventional pixel circuitry, NG (N) controls whether to write the data voltage Vdata (it may be the pixel voltage) into the gate electrode of M3 at the second display control stage.

Figure 4:
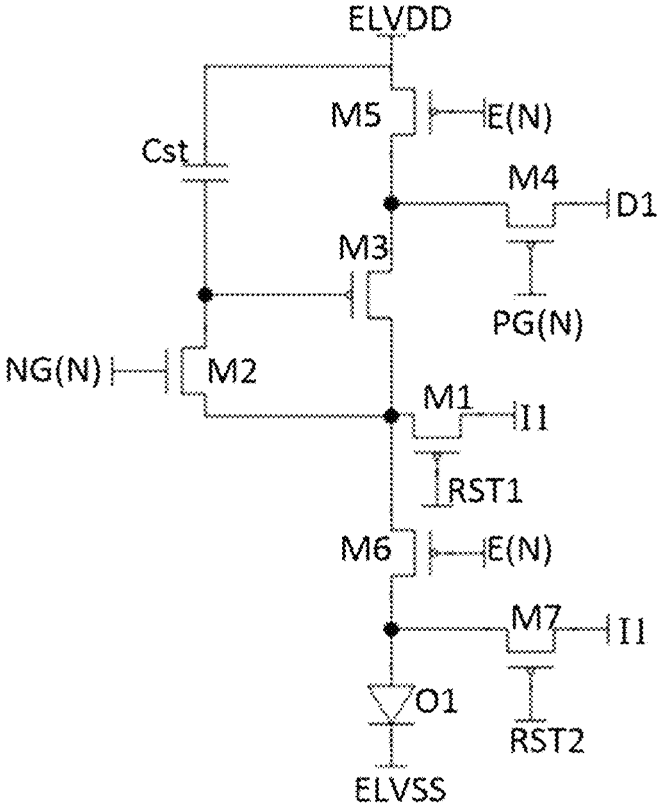
FIG. 4 is a circuit diagram of the pixel circuitry in the related art.

FIG. 4 is a circuit diagram of the pixel circuitry in the related art.

As shown in FIG. 4, the conventional pixel circuitry includes a first display control transistor M1, a second display control transistor M2, a driving transistor M3, a fourth display control transistor M4, a fifth display control transistor M5, a sixth display control transistor M6, a seventh display control transistor M7, a storage capacitor Cst, and an organic light-emitting diode O1. A gate electrode of M1 is electrically coupled to a third resetting end RST1, a source electrode of M1 is electrically coupled to the initial voltage end I1, and a drain electrode of M1 is electrically coupled to a drain electrode of M3. A gate electrode of M2 is electrically coupled to the first scanning end NG (N), a source electrode of M2 is electrically coupled to a gate electrode of M3, and a drain electrode of M2 is electrically coupled to the drain electrode of M3. A gate electrode of M4 is electrically coupled to the second scanning end PG (N), a source electrode of M4 is electrically coupled to the data line DI, and a drain electrode of M4 is electrically coupled to a source electrode of the M3. A gate electrode of M5 is electrically coupled to the light-emission control end E (N), a source electrode of M5 is electrically coupled to the power source voltage end ELVDD, and a drain electrode of M5 is electrically coupled to the source electrode of M3. A gate electrode of M6 is electrically coupled to the light-emission control end E (N), a source electrode of M6 is electrically coupled to the drain electrode of M3, and a drain electrode of M6 is electrically coupled to an anode of O1. A cathode of O1 is electrically coupled to the low level end ELVSS. A gate electrode of M7 is electrically coupled to a fourth resetting end RST2, a source electrode of M7 is electrically coupled to the initial voltage end I1, and a drain electrode of M7 is electrically coupled to the anode of O1.

During the operation of the pixel circuitry in FIG. 4, NG (N) controls whether to write the data voltage Vdata from the data line DI into the gate electrode of the driving transistor M3.

During the implementation, the second transistor is turned on or off under the control of the first scanning signal from NG (N), so as to control whether to write the data voltage from the data line into the gate electrode of the driving transistor, thereby to control whether to update brightness values of the pixel circuitries in a current row. When NG (N) outputs a high voltage signal, the second transistor is turned on, so as to update the brightness values of the pixel circuitries in the current row. When NG (N) outputs a low voltage signal, the second transistor is always turned off, and a change in the data voltage from the data line is not written into the gate electrode of the driving transistor, so the luminance of the organic light-emitting diode is not changed, namely, the brightness values of the pixel circuitries in the current row are maintained within a current frame. In a word, through controlling the N-type transistor to be turned on or off, it is able to refresh a brightness value of a pixel. When the brightness values of a part of pixels are not be refreshed, it is merely necessary to turn off the N-type transistor.

In at least one embodiment of the present disclosure, the gating circuitry is configured to write the gating input signal from the gating input end into the first node when a potential of the $(N-1)^{th}$-level driving signal is a first voltage and a potential of the $N^{th}$-level driving signal is a second voltage.

During the implementation, the gating circuitry writes the gating input signal into the first node when the potential of the $(N-1)^{th}$-level driving signal is the first voltage and the potential of the $N^{th}$-level driving signal is the second voltage.

In a possible embodiment of the present disclosure, the first voltage may be, but not limited to, a high voltage and the second voltage may be, but not limited to, a low voltage. In some embodiments of the present disclosure, the first voltage may be a low voltage and the second voltage may be a high voltage.

In a possible embodiment of the present disclosure, the gating circuitry includes a first transistor, a gate electrode of the first transistor is electrically coupled to the gating control end, a first electrode of the first transistor is electrically coupled to the first node, and a second electrode of the first transistor is electrically coupled to the gating input end.

Figure 5:
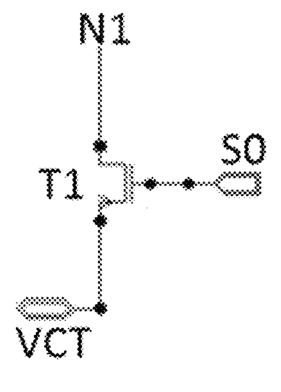
FIG. 5 is a circuit diagram of a gating circuitry in the driving circuitry according to one embodiment of the present disclosure.

As shown in FIG. 5, the gating circuitry includes a first transistor T1. A gate electrode of the first transistor T1 is electrically coupled to a gating control end S0, a drain electrode of the first transistor T1 is electrically coupled to a first node N1, and a source electrode of the first transistor T1 is electrically coupled to a gating input end VCT. T1 is a p-type transistor.

Figure 6:
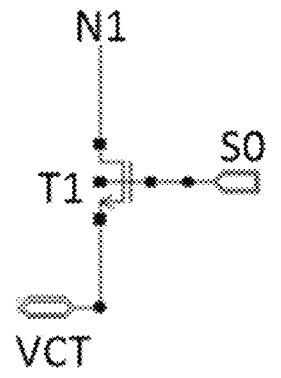
FIG. 6 is another circuit diagram of the gating circuitry in the driving circuitry according to one embodiment of the present disclosure.

As shown in FIG. 6, the gating circuitry includes a first transistor T1. A gate electrode of the first transistor T1 is electrically coupled to the gating control end S0, a source electrode of the first transistor T1 is electrically coupled to the first node N1, and a drain electrode of the first transistor T1 is electrically coupled to the gating input end VCT. T1 is an n-type transistor.

In at least one embodiment of the present disclosure, the gating control end includes a first gating control end and a second gating control end, and the gating circuitry includes a first transistor and a second transistor.

A gate electrode of the first transistor is electrically coupled to the first gating control end, a first electrode of the first transistor is electrically coupled to the first node, and a second electrode of the first transistor is electrically coupled to a first electrode of the second transistor.

A gate electrode of the second transistor is electrically coupled to the second gating control end, and a second electrode of the second transistor is electrically coupled to the gating input end.

The first gating control end is the $(N-1)^{th}$-level driving signal output end, the second gating control end is the $N^{th}$-level driving signal output end, the first transistor is an n-type transistor, and the second transistor is a p-type transistor; or the first gating control end is the $N^{th}$-level driving signal output end, the second gating control end is the $(N-1)^{th}$-level driving signal output end, the first transistor is a p-type transistor, and the second transistor is an n-type transistor: or the first gating control end is configured to receive a signal having a phase inverse to the $(N-1)^{th}$-level driving signal, the second gating control end is the $N^{th}$-level driving signal output end, and the first transistor and the second transistor are both p-type transistors: or the first gating control end is the $N^{th}$-level driving signal output end, and the second gating control end is configured to receive a signal having a phase inverse to the $(N-1)^{th}$-level driving signal, and the first transistor and the second transistor are both p-type transistors: or the first gating control end is an $(N-1)^{th}$-level driving signal end, the second gating control end is configured to receive a signal having a phase inverse to the $N^{th}$-level driving signal, and the first transistor and the second transistor are both n-type transistors: or the first gating control end is configured to receive a signal having a phase inverse to the $N^{th}$-level driving signal, the second gating control end is the $(N-1)^{th}$-level driving signal end, and the first transistor and the second transistor are both n-type transistors.

Figure 7:
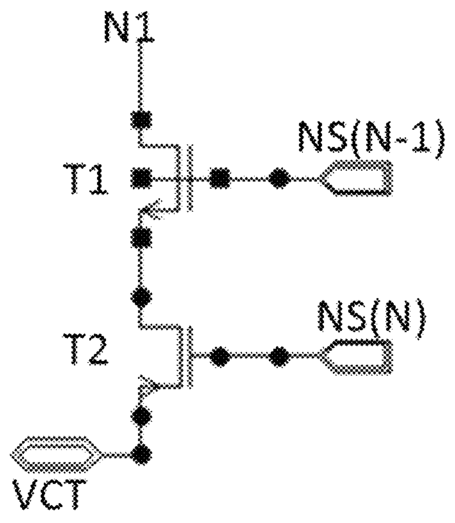
FIG. 7 is yet another circuit diagram of the gating circuitry in the driving circuitry according to one embodiment of the present disclosure.

As shown in FIG. 7, the gating circuitry includes a first transistor T1 and a second transistor T2. A gate electrode of the first transistor T1 is electrically coupled to an $(N-1)^{th}$-level driving signal output end NS (N−1), a source electrode of the first transistor T1 is electrically coupled to the first node N1, and a drain electrode of the first transistor T1 is electrically coupled to a drain electrode of the second transistor T2. A gate electrode of the second transistor T2 is electrically coupled to an $N^{th}$-level driving signal output end NS (N), and a source electrode of the second transistor T2 is electrically coupled to the gating input end VCT. T1 is an n-type transistor and T2 is a p-type transistor.

Figure 8:
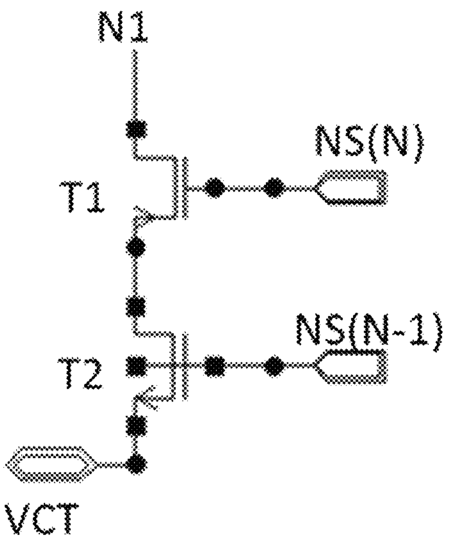
FIG. 8 is still yet another circuit diagram of the gating circuitry in the driving circuitry according to one embodiment of the present disclosure.

As shown in FIG. 8, the gating circuitry includes a first transistor T1 and a second transistor T2. A gate electrode of the first transistor T1 is electrically coupled to the $N^{th}$-level driving signal output end NS (N), a drain electrode of the first transistor T1 is electrically coupled to the first node N1, and a source electrode of the first transistor T1 is electrically coupled to a source electrode of the second transistor T2. A gate electrode of the second transistor T2 is electrically coupled to the (N−1)$^{th}$-level driving signal output end NS (N−1), and a drain electrode of the second transistor T2 is electrically coupled to the gating input end VCT. T1 is a p-type transistor and T2 is an n-type transistor.

Figure 9:
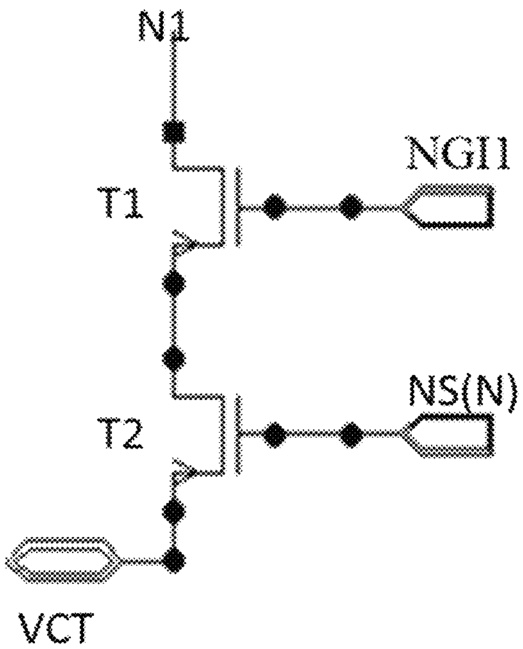
FIG. 9 is still yet another circuit diagram of the gating circuitry in the driving circuitry according to one embodiment of the present disclosure.

As shown in FIG. 9, the gating circuitry includes a first transistor T1 and a second transistor T2. A gate electrode of the first transistor T1 is electrically coupled to a first phase-inversion driving signal end NGI1, a drain electrode of the first transistor T1 is electrically coupled to the first node N1, and a source electrode of the first transistor T1 is electrically coupled to a drain electrode of the second transistor T2. A first phase-inversion driving signal from the first phase-inversion driving signal end NGI1 has a phase inverse to an (N−1)$^{th}$-level driving signal from the (N−1)$^{th}$-level driving signal output end NS (N−1). A gate electrode of the second transistor T2 is electrically coupled to the N$^{th}$-level driving signal output end NS (N), and a source electrode of the second transistor T2 is electrically coupled to the gating input end VCT. T1 is a p-type transistor and T2 is a p-type transistor.

Figure 10:
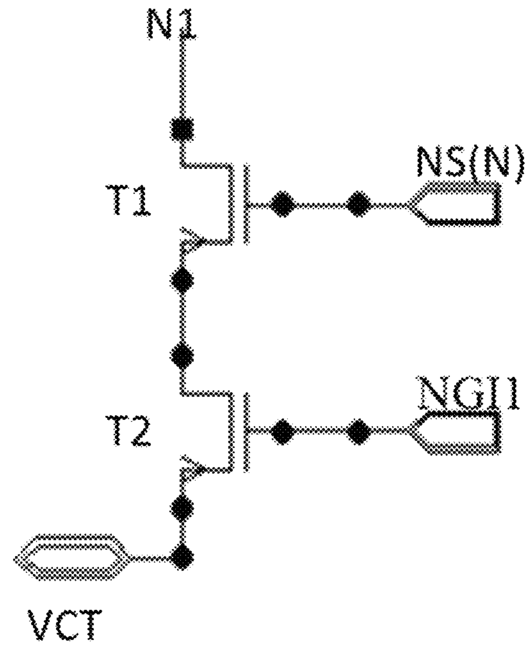
FIG. 10 is still yet another circuit diagram of the gating circuitry in the driving circuitry according to one embodiment of the present disclosure.

As shown in FIG. 10, the gating circuitry includes a first transistor T1 and a second transistor T2. A gate electrode of the first transistor T1 is electrically coupled to the N$^{th}$-level driving signal output end NS (N), a drain electrode of the first transistor T1 is electrically coupled to the first node N1, and a source electrode of the first transistor T1 is electrically coupled to a drain electrode of the second transistor T2. A gate electrode of the second transistor T2 is electrically coupled to the first phase-inversion driving signal end NGI1, and a source electrode of the second transistor T2 is electrically coupled to the gating input end VCT. A first phase-inversion driving signal from the first phase-inversion driving signal end NGI1 has a phase inverse to the (N−1)$^{th}$-level driving signal from the (N−1)$^{th}$-level driving signal output end NS (N−1). T1 is a p-type transistor and T2 is a p-type transistor.

Figure 11:
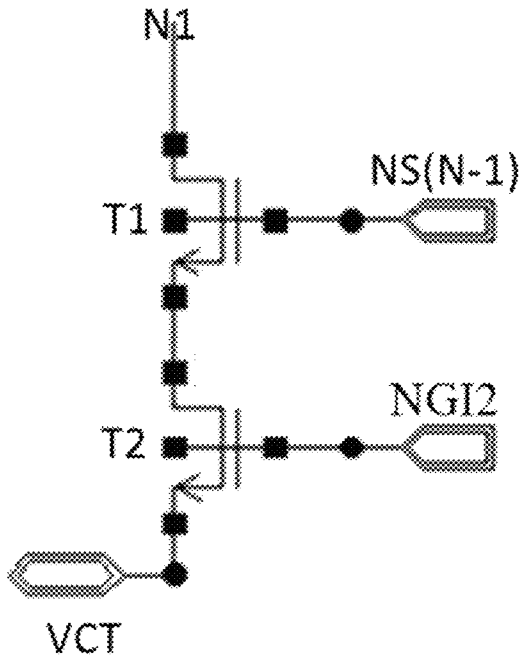
FIG. 11 is still yet another circuit diagram of the gating circuitry in the driving circuitry according to one embodiment of the present disclosure.

As shown in FIG. 11, the gating circuitry includes a first transistor T1 and a second transistor T2. A gate electrode of the first transistor T1 is electrically coupled to an (N−1)$^{th}$-level driving signal output end NS (N−1), a source electrode of the first transistor T1 is electrically coupled to the first node N1, and a drain electrode of the first transistor T1 is electrically coupled to a source electrode of the second transistor T2. A gate electrode of the second transistor T2 is electrically coupled to a second phase-inversion driving signal end NGI2, and a drain electrode of the second transistor T2 is electrically coupled to the gating input end VCT. A second phase-inversion driving signal from the second phase-inversion driving signal end NGI2 has a phase inverse to the N$^{th}$-level driving signal from the N$^{th}$-level driving signal output end NS (N). T1 is an n-type transistor and T2 is an n-type transistor.

Figure 12:
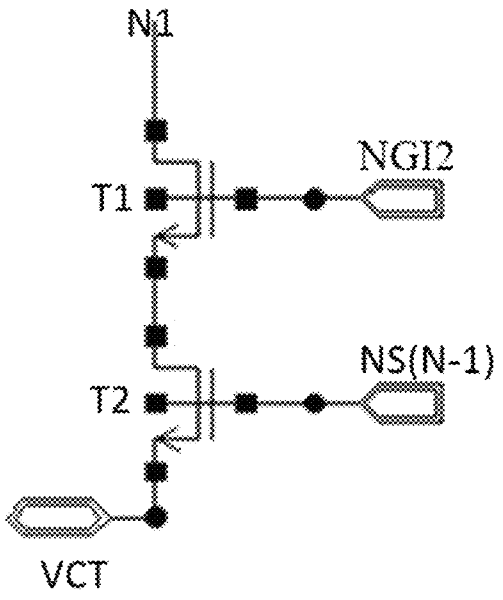
FIG. 12 is still yet another circuit diagram of the gating circuitry in the driving circuitry according to one embodiment of the present disclosure.

As shown in FIG. 12, the gating circuitry includes a first transistor T1 and a second transistor T2. A gate electrode of the first transistor T1 is electrically coupled to the second phase-inversion driving signal end NGI2, a source electrode of the first transistor T1 is electrically coupled to the first node N1, and a drain electrode of the first transistor T1 is electrically coupled to a source electrode of the second transistor T2. A second phase-inversion driving signal from the second inversion driving signal end NGI2 has a phase inverse to the N$^{th}$-level driving signal from the N$^{th}$-level driving signal output end NS (N). A gate electrode of the second transistor T2 is electrically coupled to the (N−1)$^{th}$-level driving signal output end NS (N−1), and a drain electrode of the second transistor T2 is electrically coupled to the gating input end VCT. T1 is an n-type transistor and T2 is an n-type transistor.

Figure 13:
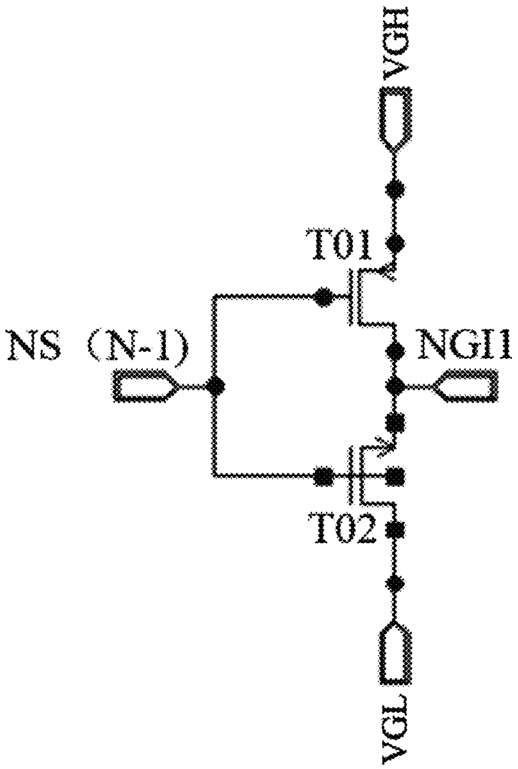
FIG. 13 is a circuit diagram of a phase inverter according to one embodiment of the present disclosure.

As shown in FIG. 13, the (N−1)$^{th}$-level driving signal from the (N−1)$^{th}$-level driving signal output end NS (N−1) is inverted through a first phase inversion circuitry to obtain the first phase-inversion driving signal from the first phase-inversion driving signal end NGI1. The first phase-inversion circuitry includes a first phase-inversion control transistor T01 and a second phase-inversion control transistor T02. T01 is a p-type transistor and T02 is an n-type transistor.

Figure 14:
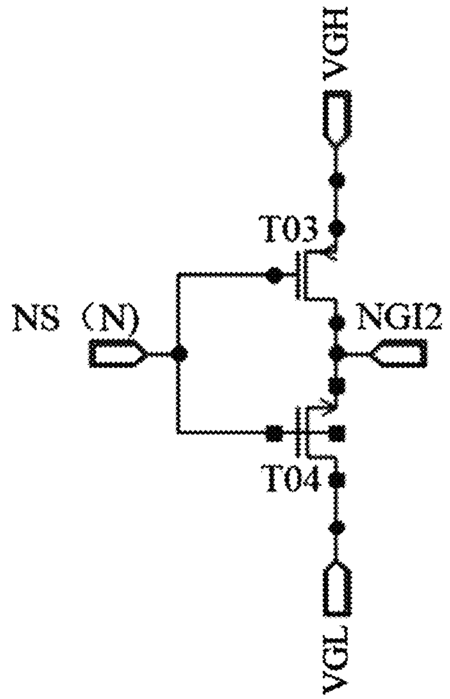
FIG. 14 is another circuit diagram of the phase inverter according to one embodiment of the present disclosure.

As shown in FIG. 14, the N$^{th}$-level driving signal from the N$^{th}$-level driving signal output end NS (N) is inverted through a second phase inversion circuitry to obtain the second phase-inversion driving signal from the second phase-inversion driving signal end NGI2. The second phase-inversion circuitry includes a third inversion control transistor T03 and a fourth inversion control transistor T04. T03 is a p-type transistor and T04 is an n-type transistor.

The driving circuitry further includes a first initialization circuitry electrically coupled to an initial control end, a first voltage end and the first node, and configured to control the first node to be electrically coupled to the first voltage end under the control of an initial control signal from the initial control end.

During the implementation, the driving circuitry further includes the first initialization circuitry, so as to control the first node to be electrically coupled to the first voltage end under the control of the initial control signal.

In a possible embodiment of the present disclosure, the first voltage end is a high voltage end.

In at least one embodiment of the present disclosure, the driving circuitry further includes a first voltage maintenance circuitry, a first end of the first voltage maintenance circuitry is electrically coupled to the first node, a second end of the first voltage maintenance circuitry is electrically coupled to a second node or a direct current voltage end, and the first voltage maintenance circuitry is configured to maintain the potential at the first node.

During the implementation, the driving circuitry further includes the first voltage maintenance circuitry, so as to maintain the potential at the first node.

Figure 15:
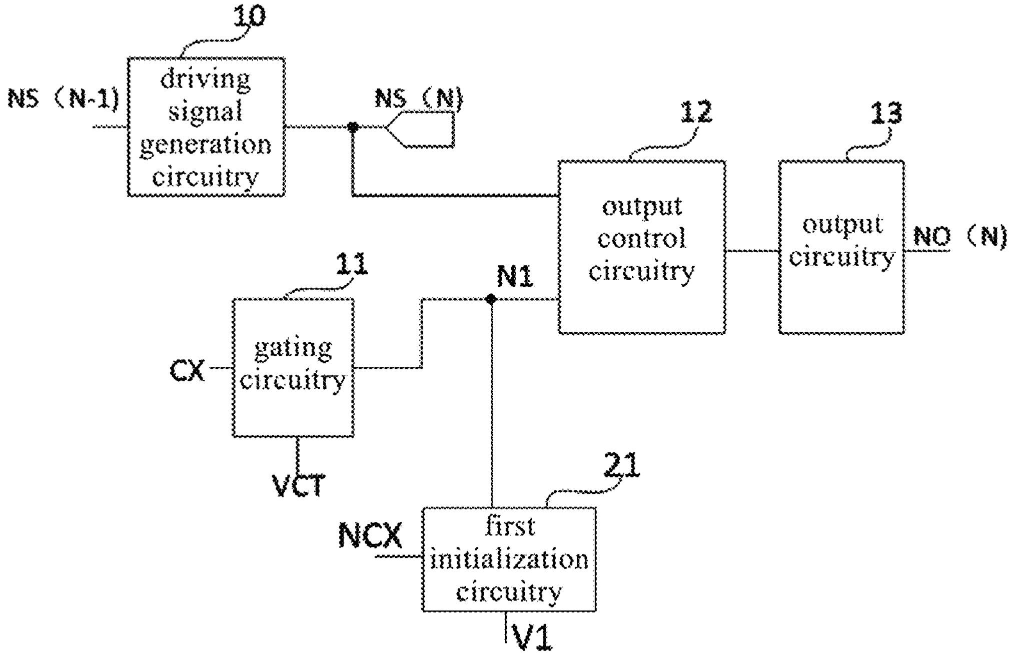
FIG. 15 is another schematic view showing the driving circuitry according to one embodiment of the present disclosure.

As shown in FIG. 15, on the basis of the driving circuitry in FIG. 1, the driving circuitry further includes a first initialization circuitry 21 electrically coupled to an initial control end NCX, the first voltage end V1 and the first node N1, and configured to control the first node N1 to be electrically coupled to the first voltage end V1 under the control of an initial control signal from the initial control end NCX.

During the operation of the driving circuitry in FIG. 15, at the beginning of one frame, NCX provides an active voltage signal, and the first initialization circuitry 21 controls the first node N1 to be electrically coupled to the first voltage end V1.

Figure 16:
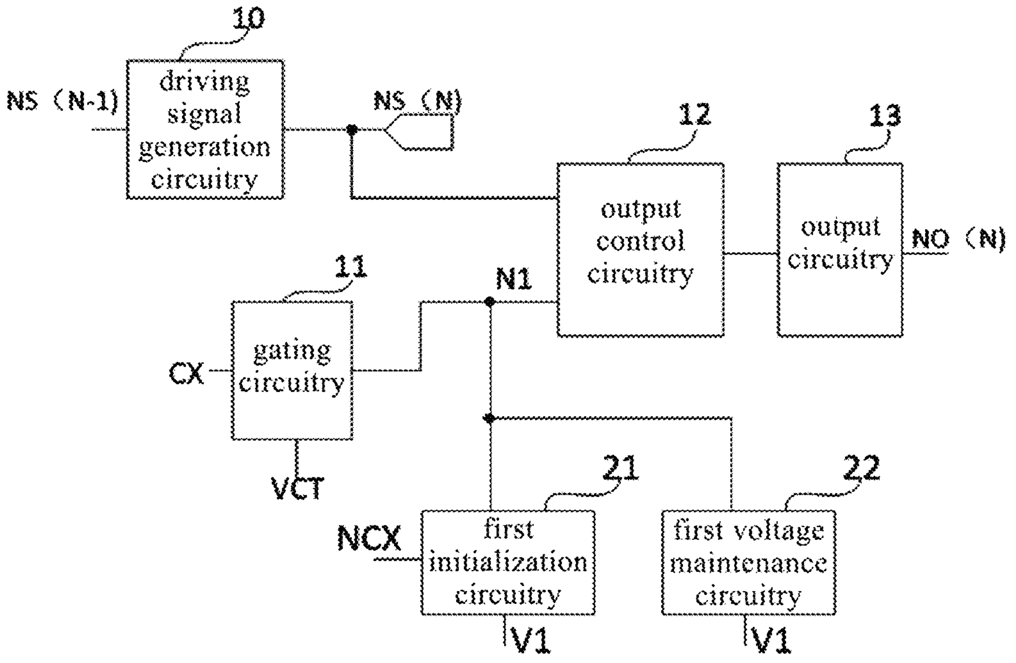
FIG. 16 is yet another schematic view showing the driving circuitry according to one embodiment of the present disclosure.

As shown in FIG. 16, on the basis of the driving circuitry in FIG. 15, the driving circuitry further includes a first voltage maintenance circuitry 22, a first end of the first voltage maintenance circuitry 22 is electrically coupled to the first node N1, a second end of the first voltage maintenance circuitry 22 is electrically coupled to the first voltage end V1, and the first voltage maintenance circuitry 22 is configured to maintain the potential at the first node N1.

In at least one embodiment of the present disclosure, the driving circuitry further includes a second voltage maintenance circuitry, and the first node is electrically coupled to the second end of the output control circuitry through the second voltage maintenance circuitry.

The second voltage maintenance circuitry includes a first phase inverter, a second phase inverter, and a maintenance control circuitry. An input end of the first phase inverter is electrically coupled to the first node, an output end of the first phase inverter is electrically coupled to the second node, an input end of the second phase inverter is electrically coupled to the second node, and an output end of the second phase inverter is electrically coupled to a third node and the second end of the output control circuitry. The first phase inverter is configured to perform phase inversion on the potential at the first node and output an inverted potential through the output end of the first phase inverter. The second phase inverter is configured to perform phase inversion on a potential at the input end of the second phase inverter and output an inverted potential through the output end of the second phase inverter. The maintenance control circuitry is electrically coupled to a maintenance control end, the third node, and the first node, and configured to control the third node to be electrically coupled to, or electrically decoupled from, the first node under the control of a maintenance control signal from the maintenance control end.

During the implementation, the driving circuitry further includes the second voltage maintenance circuitry, the first node is electrically coupled to the second end of the output control circuitry through the second voltage maintenance circuitry, and the second voltage maintenance circuitry includes the first phase inverter, the second phase inverter and the maintenance control circuitry. The first phase inverter performs phase inversion on the potential at the first node, and the second phase inverter performs phase inversion on the potential at the input end of the second phase inverter. The maintenance control circuitry controls the third node to be electrically coupled to, or electrically decoupled from, the first node under the control of the maintenance control signal from the maintenance control end. The maintenance control circuitry controls the third node to be electrically decoupled from the first node when the gating circuitry writes the gating input signal into the first node.

During the operation of the driving circuitry, the second voltage maintenance circuitry including the first phase inverter and the second phase inverter is added. When the potential at the first node is a high voltage, the third node is controlled to be electrically coupled to the high voltage end, so that the potential at the third node is greater than the potential at the first node. When the potential at the first node is a low voltage, the third node is controlled to be electrically coupled to the low voltage end, so that the potential at the third node is smaller than the potential at the first node. In this way, it is able for the third node to control the transistor of the output control circuitry whose gate electrode is electrically coupled to the third node in a better manner.

Figure 17:
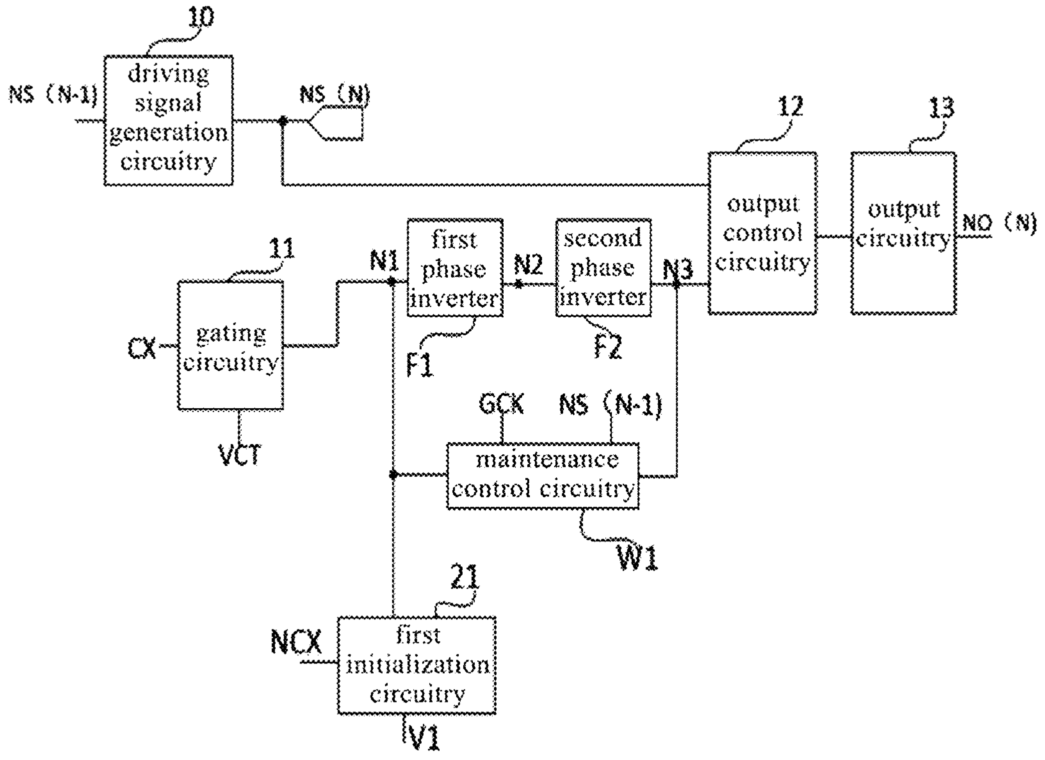
FIG. 17 is still yet another schematic view showing the driving circuitry according to one embodiment of the present disclosure.

As shown in FIG. 17, on the basis of the driving circuitry in FIG. 15, the driving circuitry further includes a second voltage maintenance circuitry, and the maintenance control end includes an $(N-1)^{th}$-level driving signal output end NS (N−1) and a first clock signal end GCK. The first node N1 is electrically coupled to the second end of the output control circuitry 12 through the second voltage maintenance circuitry. The second voltage maintenance circuitry includes a first phase inverter F1, a second phase inverter F2 and a maintenance control circuitry W1. An input end of the first phase inverter F1 is electrically coupled to the first node N1, and an output end of the first phase inverter F1 is electrically coupled to a second node N2. An input end of the second phase inverter F2 is electrically coupled to the second node N2, and an output end of the second phase inverter F2 is electrically coupled to a third node N3 and the second end of the output control circuitry 12. The first phase inverter F1 is configured to perform phase inversion on the potential at the first node N1, and output the inverted potential through the output end of the first phase inverter F1. The second phase inverter F2 is configured to perform phase inversion on the potential at the input end of the second phase inverter F2, and output the inverted potential through the output end of the second phase inverter F2. The maintenance control circuitry W1 is electrically coupled to the $(N-1)^{th}$-level driving signal output end NS (N−1), the first clock signal end GCK, the third node N3 and the first node N1, and configured to control the third node N3 to be electrically coupled to, or electrically decoupled from, the first node N1 under the control of the $(N-1)^{th}$-level driving signal from the $(N-1)^{th}$-level driving signal output end NS (N−1), and control the third node N3 to be electrically coupled to, or electrically decoupled from, the first node N1 under the control of the first clock signal from the first clock signal end GCK.

In FIG. 17, the $(N-1)^{th}$-level driving signal output end may be replaced with, but not limited to, the second clock signal end.

In a possible embodiment of the present disclosure, the maintenance control end includes a first maintenance control end and a second maintenance control end, and the maintenance control circuitry includes a third transistor and a fourth transistor. A gate electrode of the third transistor is electrically coupled to the first maintenance control end, a first electrode of the third transistor is electrically coupled to the first node, and a second electrode of the third transistor is electrically coupled to the third node. A gate electrode of the fourth transistor is electrically coupled to the second maintenance control end, a first electrode of the fourth transistor is electrically coupled to the third node, and a second electrode of the fourth transistor is electrically coupled to the first node. The third transistor is a p-type transistor, and the fourth transistor is an n-type transistor. The first maintenance control end is the $(N-1)^{th}$-level driving signal end, and the second maintenance control end is a first clock signal end; or the first maintenance control end is a second clock signal end, and the second maintenance control end is the first clock signal end.

In a possible embodiment of the present disclosure, the first phase inverter includes a fifth transistor and a sixth transistor, and the second phase inverter includes a seventh transistor and an eighth transistor. A gate electrode of the fifth transistor is electrically coupled to the first node, a first electrode of the fifth transistor is electrically coupled to the first voltage end, and a second electrode of the fifth transistor is electrically coupled to the second node. A gate electrode of the sixth transistor is electrically coupled to the first node, a first electrode of the sixth transistor is electrically coupled to the second node, and a second electrode of the sixth transistor is electrically coupled to the second voltage end. The fifth transistor is a p-type transistor, and the sixth transistor is an n-type transistor. A gate electrode of the seventh transistor is electrically coupled to the second node, a first electrode of the seventh transistor is electrically coupled to the first voltage end, and a second electrode of the seventh transistor is electrically coupled to the third node. A gate electrode of the eighth transistor is electrically coupled to the second node, a first electrode of the eighth transistor is electrically coupled to the third node, and a second electrode of the eighth transistor is electrically coupled to the second voltage end. The seventh transistor is a p-type transistor, and the eighth transistor is an n-type transistor.

In a possible embodiment of the present disclosure, the first initialization circuitry includes a ninth transistor, and the first voltage maintenance circuitry includes a first capacitor. A gate electrode of the ninth transistor is electrically coupled to the initial control end, a first electrode of the ninth transistor is electrically coupled to the first voltage end, and a second electrode of the ninth transistor is electrically coupled to the first node. A first end of the first capacitor is electrically coupled to the first node, and a second end of the first capacitor is electrically coupled to the direct current voltage end or the second node.

In a possible embodiment of the present disclosure, the output control circuitry includes a tenth transistor, an eleventh transistor, a twelfth transistor and a thirteenth transistor. A gate electrode of the tenth transistor is electrically coupled to the $N^{th}$-level driving signal output end, a first electrode of the tenth transistor is electrically coupled to the first voltage end, and a second electrode of the tenth transistor is electrically coupled to a fourth node. A gate electrode of the eleventh transistor is electrically coupled to the first node, a first electrode of the eleventh transistor is electrically coupled to the first voltage end, and a second electrode of the eleventh transistor is electrically coupled to the fourth node. A gate electrode of the twelfth transistor is electrically coupled to the $N^{th}$-level driving signal output end, a first electrode of the twelfth transistor is electrically coupled to the fourth node, and a second electrode of the twelfth transistor is electrically coupled to a fifth node. A gate electrode of the thirteenth transistor is electrically coupled to the first node, a first electrode of the thirteenth transistor is electrically coupled to the fifth node, and a second electrode of the thirteenth transistor is electrically coupled to the second voltage end. The tenth transistor and the eleventh transistor are p-type transistors, and the twelfth transistor and the thirteenth transistor are n-type transistors.

In a possible embodiment of the present disclosure, the output control circuitry includes a tenth transistor, an eleventh transistor, a twelfth transistor and a thirteenth transistor. A gate electrode of the tenth transistor is electrically coupled to the $N^{th}$-level driving signal output end, a first electrode of the tenth transistor is electrically coupled to the first voltage end, and a second electrode of the tenth transistor is electrically coupled to a fourth node. A gate electrode of the eleventh transistor is electrically coupled to the third node, a first electrode of the eleventh transistor is electrically coupled to the first voltage end, and a second electrode of the eleventh transistor is electrically coupled to the fourth node. A gate electrode of the twelfth transistor is electrically coupled to the $N^{th}$-level driving signal output end, a first electrode of the twelfth transistor is electrically coupled to the fourth node, and a second electrode of the twelfth transistor is electrically coupled to a fifth node. A gate electrode of the thirteenth transistor is electrically coupled to the third node, a first electrode of the thirteenth transistor is electrically coupled to the fifth node, and a second electrode of the thirteenth transistor is electrically coupled to the second voltage end. The tenth transistor and the eleventh transistor are p-type transistors, and the twelfth transistor and the thirteenth transistor are n-type transistors.

In a possible embodiment of the present disclosure, the output circuitry includes a fourteenth transistor and a fifteenth transistor. A gate electrode of the fourteenth transistor is electrically coupled to a fourth node, a first electrode of the fourteenth transistor is electrically coupled to the first voltage end, and a second electrode of the fourteenth transistor is electrically coupled to the output driving end. A gate electrode of the fifteenth transistor is electrically coupled to the fourth node, a first electrode of the fifteenth transistor is electrically coupled to the output driving end, and a second electrode of the fifteenth transistor is electrically coupled to the second voltage end.

In at least one embodiment of the present disclosure, the driving signal generation circuitry includes a first control circuitry, a second control circuitry, a third phase inverter, and a second initialization circuitry. The first control circuitry is electrically coupled to the first clock signal end, the second clock signal end, the $(N-1)^{th}$-level driving signal output end, and a sixth node, and configured to perform a shifting operation and phase inversion on the $(N-1)^{th}$-level driving signal from the $(N-1)^{th}$-level driving signal output end under the control of a first clock signal from the first clock signal end and a second clock signal from the second clock signal end to obtain and output an inverted signal through the sixth node. The second control circuitry is electrically coupled to the first clock signal end, the second clock signal end, the $N^{th}$-level driving signal output end, and the sixth node, and configured to perform phase inversion on the $N^{th}$-level driving signal from the $N^{th}$-level driving signal output end under the control of the first clock signal and the second clock signal to obtain and output an inverted signal through the sixth node. The third phase inverter is electrically coupled to the sixth node and the $N^{th}$-level driving signal output end, and configured to perform phase inversion on a potential of the sixth node and outputting an inverted signal through the $N^{th}$-level driving signal output end. The second initialization circuitry is electrically coupled to the initial control end, the first voltage end, and the $N^{th}$-level driving signal output end, and configured to control the $N^{th}$-level driving signal output end to be electrically coupled to the first voltage end under the control of the initial control signal from the initial control end.

During the implementation, the driving signal generation circuitry includes the first control circuitry, the second control circuitry, the third phase inverter and the second initialization circuitry. Under the control of the first clock signal and the second clock signal, the first control circuitry performs a shifting operation and phase inversion on the $(N-1)^{th}$ driving signal, and outputs an inverted signal through the sixth node. Under the control of the first clock signal and the second clock signal, the second control circuitry performs phase inversion on the $N^{th}$-level driving signal, and outputs an inverted signal through the sixth node. The third phase inverter performs phase inversion on the potential at the sixth node, and outputs an inverted signal through the $N^{th}$-level driving signal output end. The second initialization circuitry controls the $N^{th}$-level driving signal output end to be electrically coupled to the first voltage end under the control of the initial control signal.

Figure 18:
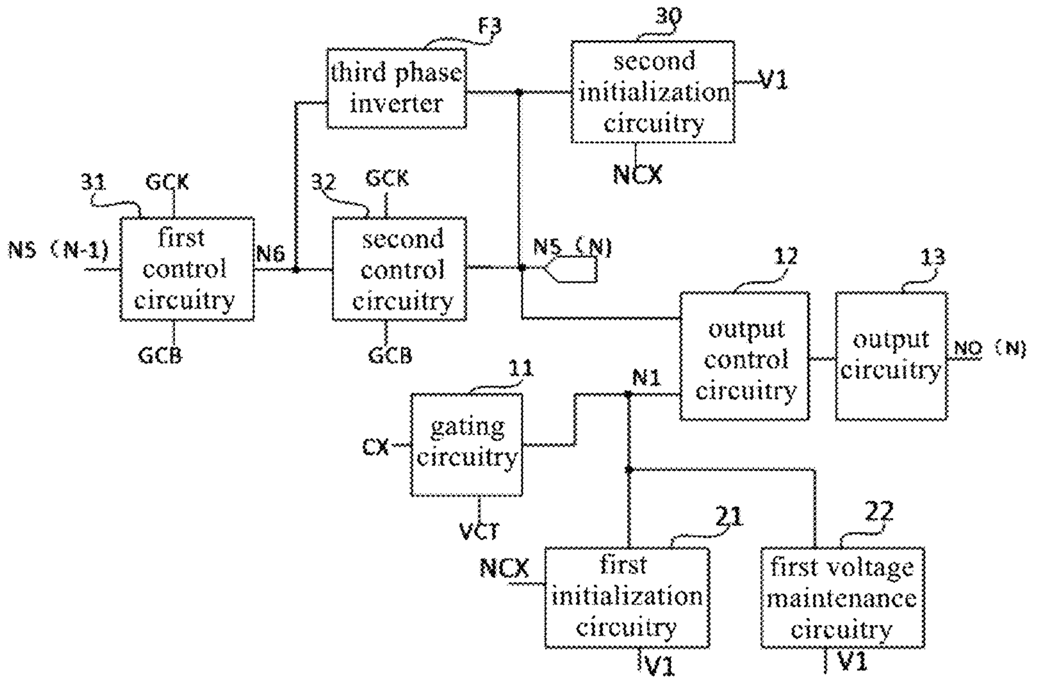
FIG. 18 is still yet another schematic view showing the driving circuitry according to one embodiment of the present disclosure.

As shown in FIG. 18, on the basis of the driving circuitry in FIG. 16, the driving signal generation circuitry includes a first control circuitry 31, a second control circuitry 32, a third phase inverter F3 and a second initialization circuitry 30.

The first control circuitry 31 is electrically coupled to the first clock signal end GCK, the second clock signal end GCB, the $(N-1)^{th}$-level driving signal output end NS (N−1) and a sixth node N6, and configured to perform a shifting operation and phase inversion on the $(N-1)^{th}$ driving signal from the $(N-1)^{th}$-level driving signal output end NS (N−1) under the control of a first clock signal from the first clock signal end GCK and a second clock signal from the second clock signal end GCB to obtain and output an inverted signal through the sixth node N6.

The second control circuitry 32 is electrically coupled to the first clock signal end GCK, the second clock signal end GCB, the $N^{th}$-level driving signal output end NS (N) and the sixth node N6, and configured to perform phase inversion on the $N^{th}$-level driving signal from the $N^{th}$-level driving signal output end NS (N) under the control of the first clock signal and the second clock signal to obtain and output an inverted signal through the sixth node N6.

The third phase inverter F3 is electrically coupled to the sixth node N6 and the $N^{th}$-level driving signal output end NS (N), and configured to perform phase inversion on the potential at the sixth node N6 and outputting an inverted signal through the $N^{th}$-level driving signal output end NS (N).

The second initialization circuitry 30 is electrically coupled to the initial control end NCX, the first voltage end V1 and the $N^{th}$-level driving signal output end NS (N), and configured to control the $N^{th}$-level driving signal output end NS (N) to be electrically coupled to the first voltage end V1 under the control of the initial control signal from the initial control end NCX.

Figure 19:
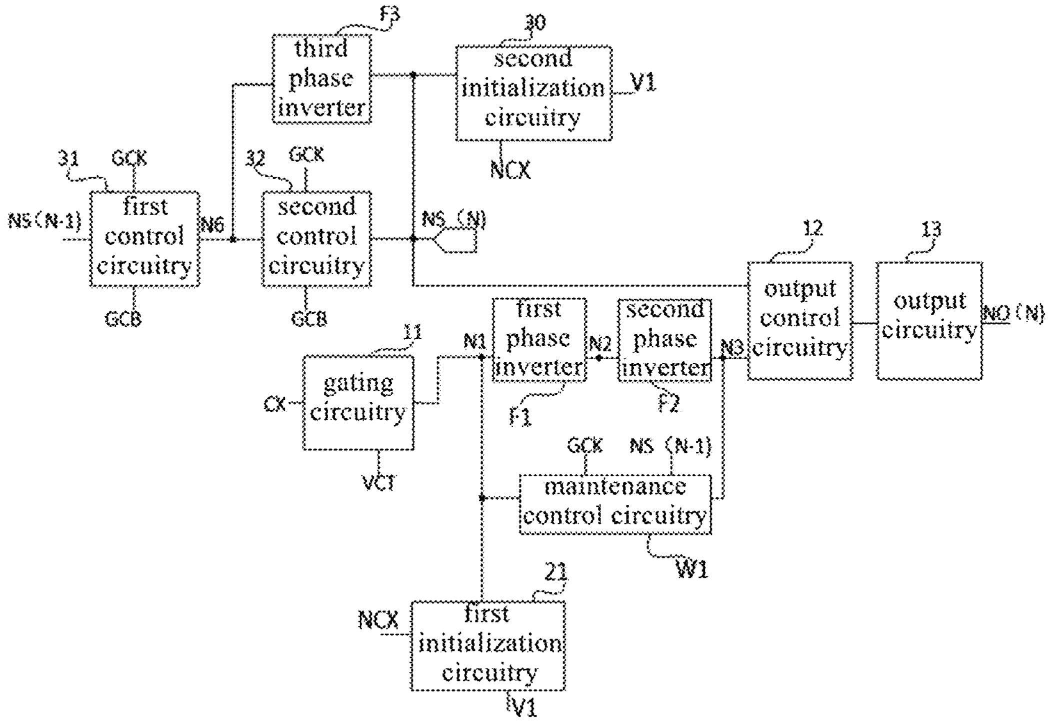
FIG. 19 is still yet another schematic view showing the driving circuitry according to one embodiment of the present disclosure.

As shown in FIG. 19, on the basis of the driving circuitry in FIG. 17, the driving signal generation circuitry includes a first control circuitry 31, a second control circuitry 32, a third phase inverter F3 and a second initialization circuitry 30.

The first control circuitry 31 is electrically coupled to the first clock signal end GCK, the second clock signal end GCB, the $(N-1)^{th}$-level driving signal output end NS (N−1) and a sixth node N6, and configured to perform a shifting operation and phase inversion on the $(N-1)^{th}$ driving signal from the $(N-1)^{th}$-level driving signal output end NS (N−1) under the control of a first clock signal from the first clock signal end GCK and a second clock signal from the second clock signal end GCB to obtain and output an inverted signal through the sixth node N6.

The second control circuitry 32 is electrically coupled to the first clock signal end GCK, the second clock signal end GCB, the $N^{th}$-level driving signal output end NS (N) and the sixth node N6, and configured to perform phase inversion on the $N^{th}$-level driving signal from the $N^{th}$-level driving signal output end NS (N) under the control of the first clock signal and the second clock signal to obtain and output an inverted signal through the sixth node N6.

The third phase inverter F3 is electrically coupled to the sixth node N6 and the $N^{th}$-level driving signal output end NS (N), and configured to perform phase inversion on the potential at the sixth node N6 and outputting an inverted signal through the $N^{th}$-level driving signal output end NS (N).

The second initialization circuitry 30 is electrically coupled to the initial control end NCX, the first voltage end V1 and the $N^{th}$-level driving signal output end NS (N), and configured to control the $N^{th}$-level driving signal output end NS (N) to be electrically coupled to the first voltage end V1 under the control of the initial control signal from the initial control end NCX.

In a possible embodiment of the present disclosure, the first control circuitry includes a sixteenth transistor, a seventeenth transistor, an eighteenth transistor, and a nineteenth transistor. A gate electrode of the sixteenth transistor is electrically coupled to the second clock signal end, a first electrode of the sixteenth transistor is electrically coupled to the first voltage end, and a second electrode of the sixteenth transistor is electrically coupled to a first electrode of the seventeenth transistor. A gate electrode of the seventeenth transistor is electrically coupled to the $(N-1)^{th}$-level driving signal output end, and a second electrode of the seventeenth transistor is electrically coupled to the sixth node. A gate electrode of the eighteenth transistor is electrically coupled to the $(N-1)^{th}$-level driving signal output end, a first electrode of the eighteenth transistor is electrically coupled to the sixth node, and a second electrode of the eighteenth transistor is electrically coupled to a first electrode of the nineteenth transistor. A gate electrode of the nineteenth transistor is electrically coupled to the first clock signal end, and a second electrode of the nineteenth transistor is electrically coupled to the second voltage end. The sixteenth transistor and the seventeenth transistor are p-type transistors, and the eighteenth transistor and the nineteenth transistor are n-type transistors.

In a possible embodiment of the present disclosure, the second control circuitry includes a twentieth transistor, a twenty-first transistor, a twenty-second transistor, and a twenty-third transistor. A gate electrode of the twentieth transistor is electrically coupled to the first clock signal end, a first electrode of the twentieth transistor is electrically coupled to the first voltage end, and a second electrode of the twentieth transistor is electrically coupled to a first electrode of the twenty-first transistor. A gate electrode of the twenty-first transistor is electrically coupled to the $N^{th}$-level driving signal output end, and a second electrode of the twenty-first transistor is electrically coupled to the sixth node. A gate electrode of the twenty-second transistor is electrically coupled to the $N^{th}$-level driving signal output end, a first electrode of the twenty-second transistor is electrically coupled to the sixth node, and a second electrode of the twenty-second transistor is electrically coupled to a first electrode of the twenty-third transistor. A gate electrode of the twenty-third transistor is electrically coupled to the second clock signal end, and a second electrode of the twenty-third transistor is electrically coupled to the second voltage end. The twentieth transistor and the twenty-first transistor are p-type transistors, and the twenty-second transistor and the twenty-third transistor are n-type transistors.

In a possible embodiment of the present disclosure, the third phase inverter includes a twenty-fourth transistor and a twenty-fifth transistor, and the second initialization circuitry includes a twenty-sixth transistor. A gate electrode of the twenty-fourth transistor is electrically coupled to the sixth node, a first electrode of the twenty-fourth transistor is electrically coupled to the first voltage end, and a second electrode of the twenty-fourth transistor is electrically coupled to a first electrode of the twenty-fifth transistor. A gate electrode of the twenty-fifth transistor is electrically coupled to the sixth node, and a second electrode of the twenty-fifth transistor is electrically coupled to the second voltage end. The twenty-fourth transistor is a p-type transistor, and the twenty-fifth transistor is an n-type transistor. A gate electrode of the twenty-sixth transistor is electrically coupled to the initial control end, a first electrode of the twenty-sixth transistor is electrically coupled to the first voltage end, and a second electrode of the twenty-sixth transistor is electrically coupled to the $N^{th}$-level driving signal output end.

In a possible embodiment of the present disclosure, the first voltage end may be, but not limited to, a high voltage end, and the second voltage end may be, but not limited to, a low voltage end.

Figure 20:
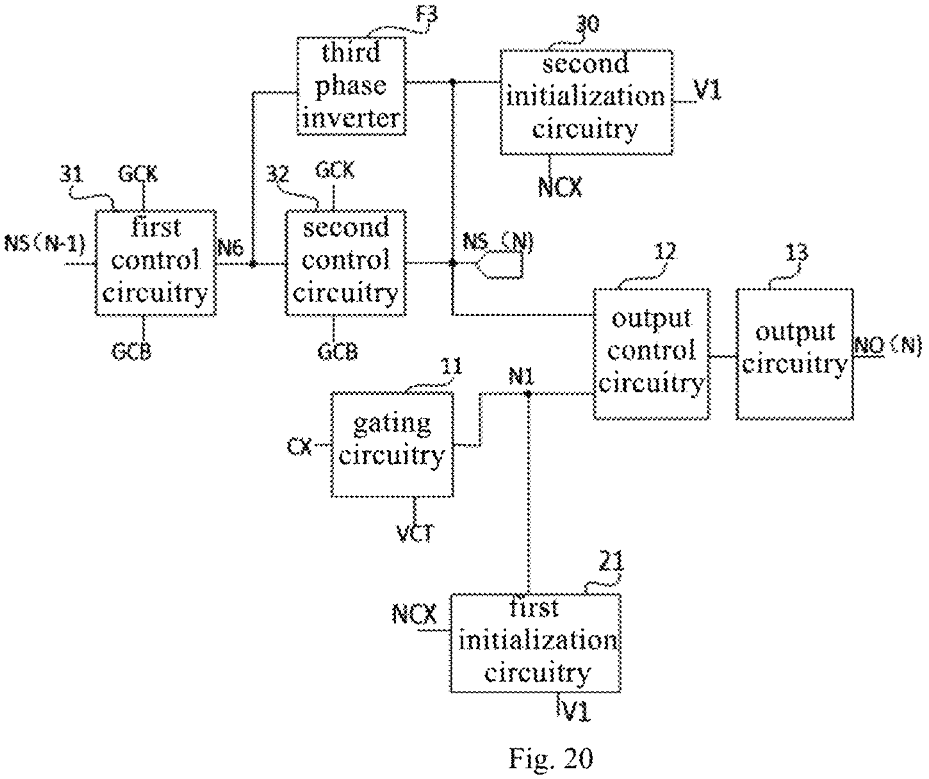
FIG. 20 is still yet another schematic view showing the driving circuitry according to one embodiment of the present disclosure.

The driving circuitry in FIG. 20 differs from that in FIG. 18 in that, the driving circuitry in FIG. 20 does not include the first voltage maintenance circuitry.

Figure 21:
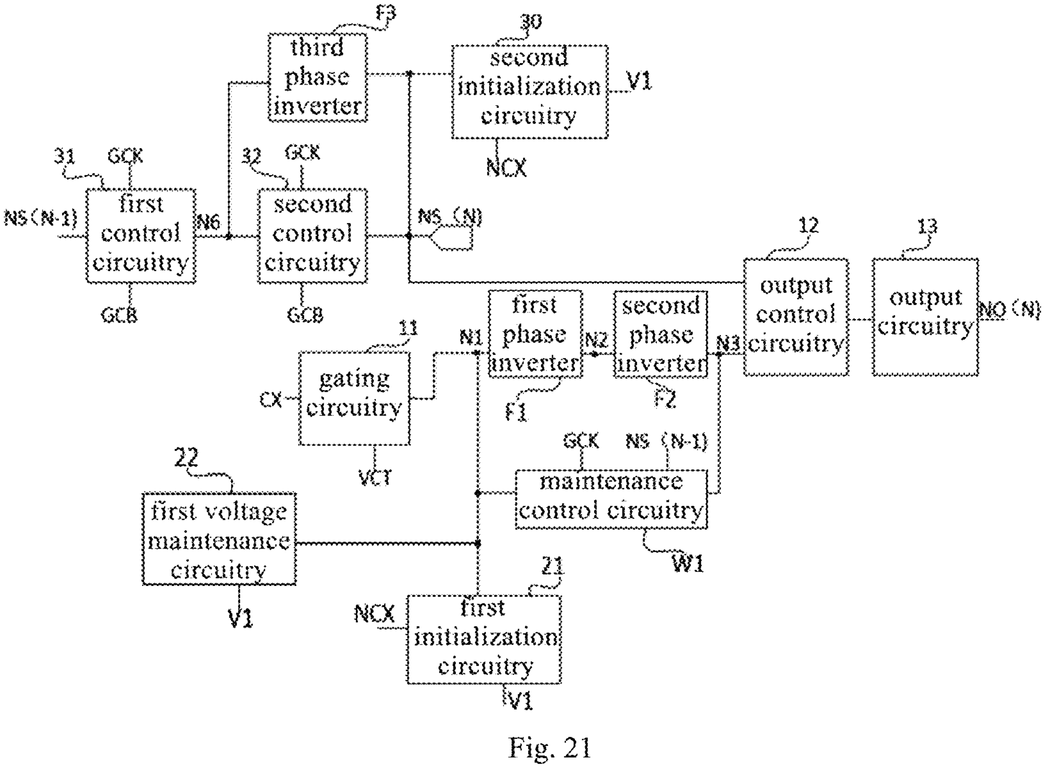
FIG. 21 is still yet another schematic view showing the driving circuitry according to one embodiment of the present disclosure.

The driving circuitry in FIG. 21 differs from that in FIG. 19 in that, the driving circuitry in FIG. 21 further includes the first voltage maintenance circuitry 22, the first end of the first voltage maintenance circuitry 22 is electrically coupled to the first node N1, the second end of the first voltage maintenance circuitry 22 is electrically coupled to the first voltage end V1, and the first voltage maintenance circuitry 22 is configured to maintain the potential at the first node N1.

Figure 22:
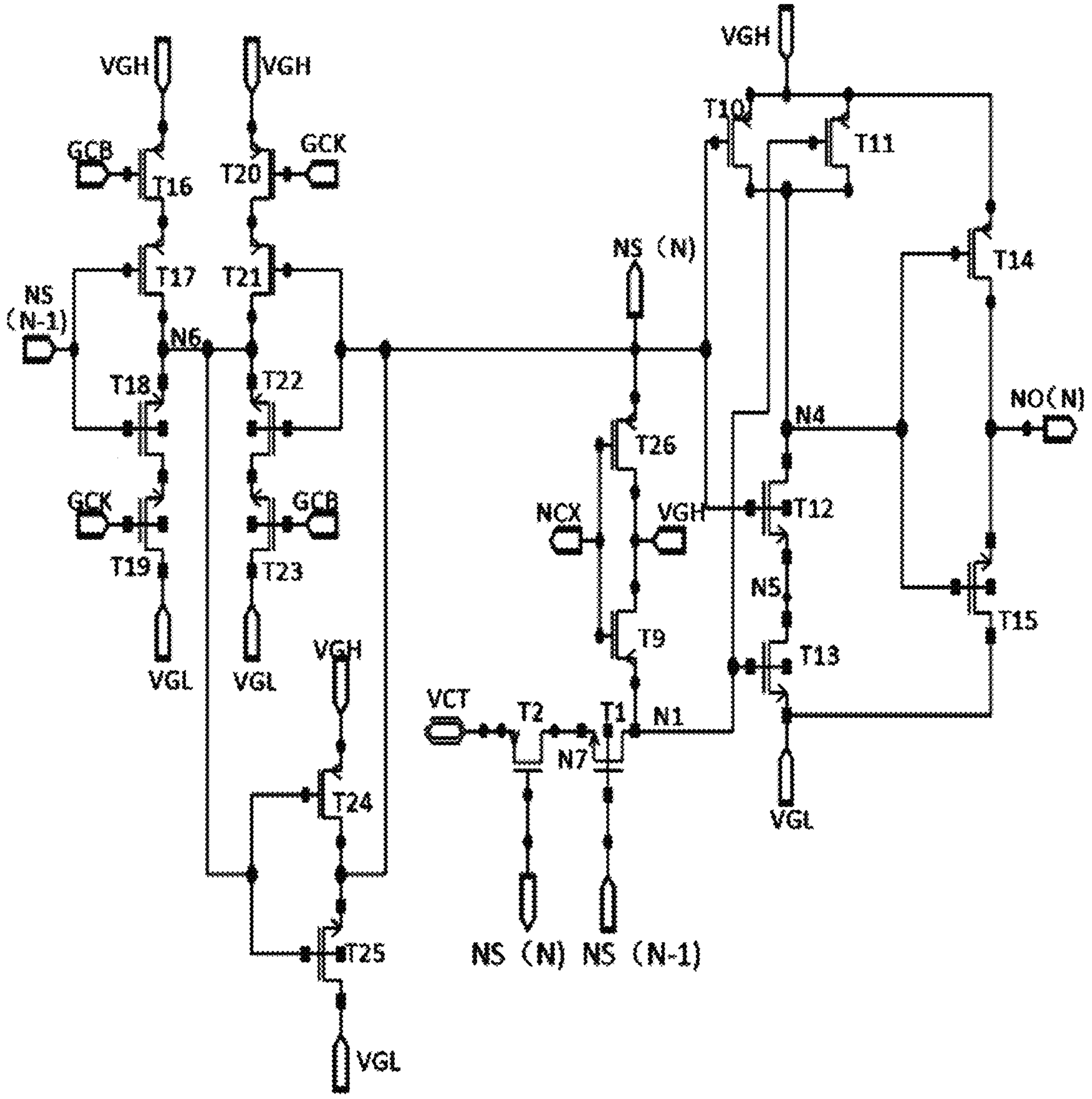
FIG. 22 is a circuit diagram of the driving circuitry according to one embodiment of the present disclosure.

As shown in FIG. 22, on the basis of the driving circuitry in FIG. 20, the gating circuitry includes a first transistor T1 and a second transistor T2. A gate electrode of the first transistor T1 is electrically coupled to the $(N-1)^{th}$-level driving signal output end NS (N−1), a source electrode of the first transistor T1 is electrically coupled to the first node N1, and a drain electrode of the first transistor T1 is electrically coupled to a drain electrode of the second transistor T2. A gate electrode of the second transistor T2 is electrically coupled to the $N^{th}$-level driving signal output end NS (N), and a source electrode of the second transistor T2 is electrically coupled to the gating input end VCT. T1 is an n-type transistor and T2 is a p-type transistor.

The first initialization circuitry includes a ninth transistor T9. A gate electrode of the ninth transistor T9 is electrically coupled to the initial control end NCX, the source electrode of the ninth transistor T9 is electrically coupled to the high voltage end VGH, and the drain electrode of the ninth transistor T9 is electrically coupled to the first node N1.

The output control circuitry includes a tenth transistor T10, an eleventh transistor T11, a twelfth transistor T12 and a thirteenth transistor T13. A gate electrode of the tenth transistor T10 is electrically coupled to the $N^{th}$-level driving signal output end NS (N), a source electrode of the tenth transistor T10 is electrically coupled to the high voltage end VGH, and the drain electrode of the tenth transistor T10 is electrically coupled to the fourth node N4. A gate electrode of the eleventh transistor T11 is electrically coupled to the first node N1, a source electrode of the eleventh transistor T11 is electrically coupled to the high voltage end VGH, and a drain electrode of the eleventh transistor T11 is electrically coupled to the fourth node N4. A gate electrode of the twelfth transistor T12 is electrically coupled to the $N^{th}$-level driving signal output end NS (N), a source electrode of the twelfth transistor T12 is electrically coupled to the fourth node N4, and a drain electrode of the twelfth transistor T12 is electrically coupled to the fifth node N5. A gate electrode of the thirteenth transistor T13 is electrically coupled to the first node N1, a source electrode of the thirteenth transistor T13 is electrically coupled to the fifth node N5, and a drain electrode of the thirteenth transistor T13 is electrically coupled to a low voltage end (VGL). The tenth transistor T10 and the eleventh transistor T11 are p-type transistors, and the twelfth transistor T12 and the thirteenth transistor T13 are n-type transistors.

The output circuitry includes a fourteenth transistor T14 and a fifteenth transistor T15. A gate electrode of the fourteenth transistor T14 is electrically coupled to the fourth node N4, a source electrode of the fourteenth transistor T14 is electrically coupled to the high voltage end VGH, and a drain electrode of the fourteenth transistor T14 is electrically coupled to the output driving end NO (N). A gate electrode of the fifteenth transistor T15 is electrically coupled to the fourth node N4, a source electrode of the fifteenth transistor T15 is electrically coupled to the output driving end NO (N), and a drain electrode of the fifteenth transistor T15 is electrically coupled to the low voltage end VGL.

The first control circuitry includes a sixteenth transistor T16, a seventeenth transistor T17, an eighteenth transistor T18 and a nineteenth transistor T19. A gate electrode of the sixteenth transistor T16 is electrically coupled to the second clock signal end GCB, a source electrode of the sixteenth transistor T16 is electrically coupled to the high voltage end VGH, and a drain electrode of the sixteenth transistor T16 is electrically coupled to a source electrode of the seventeenth transistor T17. A gate electrode of the seventeenth transistor T17 is electrically coupled to the N−1 level driving signal output end NS (N−1), and a drain electrode of the seventeenth transistor T17 is electrically coupled to the sixth node N6. A gate electrode of the eighteenth transistor T18 is electrically coupled to the N−1 level driving signal output end NS (N−1), a source electrode of the eighteenth transistor T18 is electrically coupled to the sixth node N6, and a drain electrode of the eighteenth transistor T18 is electrically coupled to a source electrode of the nineteenth transistor T19. A gate electrode of the nineteenth transistor T19 is electrically coupled to the first clock signal end GCK, and a drain electrode of the nineteenth transistor T19 is electrically coupled to the low voltage end VGL. The sixteenth transistor T16 and the seventeenth transistor T17 are p-type transistors, and the eighteenth transistor T18 and the nineteenth transistor T19 are n-type transistors.

The second control circuitry includes a twentieth transistor T20, a twenty-first transistor T21, a twenty-second transistor T22 and a twenty-third transistor T23. A gate electrode of the twentieth transistor T20 is electrically coupled to the first clock signal end GCK, a source electrode of the twentieth transistor T20 is electrically coupled to the high voltage end VGH, and a drain electrode of the twentieth transistor T20 is electrically coupled to a source electrode of the twenty-first transistor T21. A gate electrode of the twenty-first transistor T21 is electrically coupled to the $N^{th}$-level driving signal output end NS (N), and a drain electrode of the twenty-first transistor T21 is electrically coupled to the sixth node N6. A gate electrode of the twenty-second transistor T22 is electrically coupled to the $N^{th}$-level driving signal output end NS (N), a source electrode of the twenty-second transistor T22 is electrically coupled to the sixth node N6, and a drain electrode of the twenty-second transistor T22 is electrically coupled to a source electrode of the twenty-third transistor T23. A gate electrode of the twenty-third transistor T23 is electrically coupled to the second clock signal end GCB, and a drain electrode of the twenty-third transistor T23 is electrically coupled to the low voltage end VGL. The twentieth transistor T20 and the twenty-first transistor T21 are p-type transistors, and the twenty-second transistor T22 and the twenty-third transistor T23 are n-type transistors.

The third phase inverter includes a twenty-fourth transistor T24 and a twenty-fifth transistor T25, and the second initialization circuitry includes a twenty-sixth transistor T26. A gate electrode of the twenty-fourth transistor T24 is electrically coupled to the sixth node N6, a source electrode of the twenty-fourth transistor T24 is electrically coupled to the high voltage end VGH, and a drain electrode of the twenty-fourth transistor T24 is electrically coupled to a source electrode of the twenty-fifth transistor T25. A gate electrode of the twenty-fifth transistor T25 is electrically coupled to the sixth node N6, and a drain electrode of the twenty-fifth transistor T25 is electrically coupled to the low voltage end VGL. The twenty-fourth transistor T24 is a p-type transistor, and the twenty-fifth transistor T25 is an n-type transistor. A gate electrode of the twenty-sixth transistor T26 is electrically coupled to the initial control end NCX, a source electrode of the twenty-sixth transistor T26 is electrically coupled to the high voltage end VGH, and a drain electrode of the twenty-sixth transistor is electrically coupled to the $N^{th}$-level driving signal output end NS (N). The twenty-sixth transistor T26 is a p-type transistor.

In at least one embodiment of the present disclosure, the structure of the driving signal generation circuitry is not limited to that in FIG. 22. For example, it may be, but not limited to, a 16T3C circuitry, a 13T3C circuitry, a 12T3C circuitry, or a 10T3C circuitry.

During the operation of the driving circuitry in FIG. 22, (1) when GCK provides a high voltage signal, T19 is turned on and T20 is turned off. GCB provides a low voltage signal, so as to turn on T16 and turned off T23. At this time, the driving signal generation circuitry is in a transmission state. When NS (N) provides a low voltage signal, T17 is turned on and T18 is turned off. The potential at N6 is a high voltage, so as to turn on T25 and turn off T24. At this time, NS (N) provides a low voltage signal, and NS (N−1) provides a low voltage signal. When NS (N) provides a high voltage signal, T17 is turned off and T18 is turned on. The potential at N6 is a low voltage, so as to turn off T25 and turn on T24. At this time, both NS (N) and NS (N−1) provide a high voltage signal.

(2) When the GCK provides a low voltage signal, T19 is turned off and T20 is turned on. GCB provides a high voltage signal, so as to turn off T16 and turn on T23. At this time, the circuitry is in a registered state, and T21, T22, T23 and T11 form a latch circuitry. The potential at N6 and the signal from the NS (N) are maintained in a previous state.

(3) When the signal from NS (N−1) is switched from a low voltage signal to a high voltage signal, GCK provides a low voltage signal, so as to turn off T19 and turn on T20. GCB provides a high voltage signal, so as to turn off T16 and turn on T23. At this time, the circuitry is in a registered state, and T21, T22, T23 and T11 form a latch circuitry. The potential at N6 and the signal from NS (N) are maintained in a low voltage state, and a shifting operation is completed. At a next time point, GCK provides a high voltage signal, so as to turn on T19 and turn off T20. GCB provides a low voltage signal, so as to turn on T16 and turn off T23. At this time, the circuitry is in a transmission state. NS (N−1) provides a high voltage signal, so as to turn off T17 and turn on T18. The potential at N6 is a low voltage, so as to turn off T25 and turn on T24. Both the NS (N) and the NS (N−1) provide a high voltage signal, so as to realize the shifting from NS (N−1) to NS (N).

(4) When a high voltage signal from NS (N−1) is switched to a low voltage signal, GCK provides a low voltage signal, so as to turn off T19 and turn on T20. GCB provides a high voltage signal, so as to turn off T16 and turn on T23. At this time, the circuitry is in a registered state, and T21, T22, T23 and T11 form a latch circuitry. The potential at N6 and the signal from NS (N) are maintained in a previous high voltage state, and the shifting operation is completed. At a next time point, GCK provides a high voltage signal, so as to turn on T19 and turn off T20. GCB provides a low voltage signal, so as to turn on T16 and turn off T23. At this time, the circuitry is in a transmission state. NS (N−1) provides a low voltage signal, so as to turn on T17 and turn off T18. The potential at N6 is a high voltage, so as to turn on T25 and turn off T24. Both NS (N) and NS (N−1) provide a low voltage signal, so as to realize the shifting from NS (N−1) to NS (N).

During the operation of the driving circuitry in FIG. 22, when NS (N−1) provides a high voltage signal, T1 is turned on, and when NS (N) provides a low voltage signal, T2 is turned on. Through the two signals, the gating input signal is obtained from VCT within a high and low frequency switching period H and written into the first node N1, and then T1 and T2 are not turned on simultaneously within the other time period, so as to prevent the potential at N1 from being adversely affected by the change in the potential of the gating input signal from VCT. T10, T11, T12 and T13 form an NAND gate, and input signals of the NAND gate include the signal from NS (N) and the potential at N1. An output end of the NAND gate is electrically coupled to the fourth node N4. T24 and T25 form the third phase inverter, an input end of the third phase inverter is electrically coupled to N4, and an output end of the third phase inverter is electrically coupled to NO (N).

When VCT provides a high voltage signal in the case that T1 and T2 are turned on, a high voltage is written into N1, and NS (N) is normally delivered to NO (N) due to an on state of the NAND gate.

When VCT provides a low voltage signal in the case that T1 and T2 are turned on, a low voltage is written into N1, and the NAND gate is in an off state, so NO (N) provides a low voltage signal, i.e., it is able to maintain a low level of NO (N).

In a possible embodiment of the present disclosure, at the beginning of the display (namely, when a display device is powered on), at a power-on stage before a first stage, NCX outputs a low voltage signal, so as to turn on T9 and control the potential at N1 to be a high voltage. T26 is turned on, so that NS (N) provides a high voltage signal. At this time, T12 and T13 are both turned on, the potential at N4 is a low voltage, T14 is turned on, T15 is turned off, and NO (N) outputs a high voltage signal. The second display control transistor M2 in each pixel circuitry in the effective display region is turned on, and residual charges in the storage capacitor Cst are cleared, so as to prevent the occurrence of flickering when the display device is powered on.

Next, when NS (N−1) outputs a high voltage signal and NS (N) outputs a low voltage signal, T1 and T2 are turned on. When VCT provides a low voltage signal, the potential at N1 is a low voltage signal, and the potential at N1 is maintained through C1. T11 is turned on, T10 is turned on, the potential at N4 is a high voltage, T15 is turned on, and NO (N) outputs a low voltage signal. When VCT provides a high voltage signal, the potential at N1 is a high voltage signal, the potential at N1 is maintained through C1, T11 is turned off, T10 is turned on, the potential at N4 is a high voltage, T15 is turned on, and NO (N) outputs a low voltage signal.

Next, at a stage where the $N^{th}$-level driving signal is provided, NS (N) outputs a high voltage signal. When the potential at N1 is a low voltage, T10 is turned off, T11 is turned on, the potential at N4 is a high voltage, T15 is turned on, and NO (N) outputs a low voltage signal. When the potential at N1 is a high voltage, T10 is turned off, T11 is turned off, T12 and T13 are turned on, the potential at N4 is a low voltage, T14 is turned on, and NO (N) outputs a high voltage signal.

After the stage where the $N^{th}$-level driving signal is provided, NS (N) outputs a low voltage signal. When the potential at N1 is a low voltage signal, T10 is turned on, T11 is turned on, the potential at N4 is a high voltage, and NO (N) outputs a low voltage signal. When the potential at N1 is a high voltage signal, T10 is turned on, T11 is turned off, the potential at N4 is a high voltage, and NO (N) outputs a low voltage signal.

During the operation of the driving circuitry in FIG. 22, when NS (N−1) outputs a high voltage signal and NS (N) outputs a low voltage signal, T1 and T2 are turned on. Through the two signals, the gating input signal is obtained within the high and low frequency switching period.

In FIG. 22, N7 represents a seventh node, which is electrically coupled to the drain electrode of T1.

Figure 23:
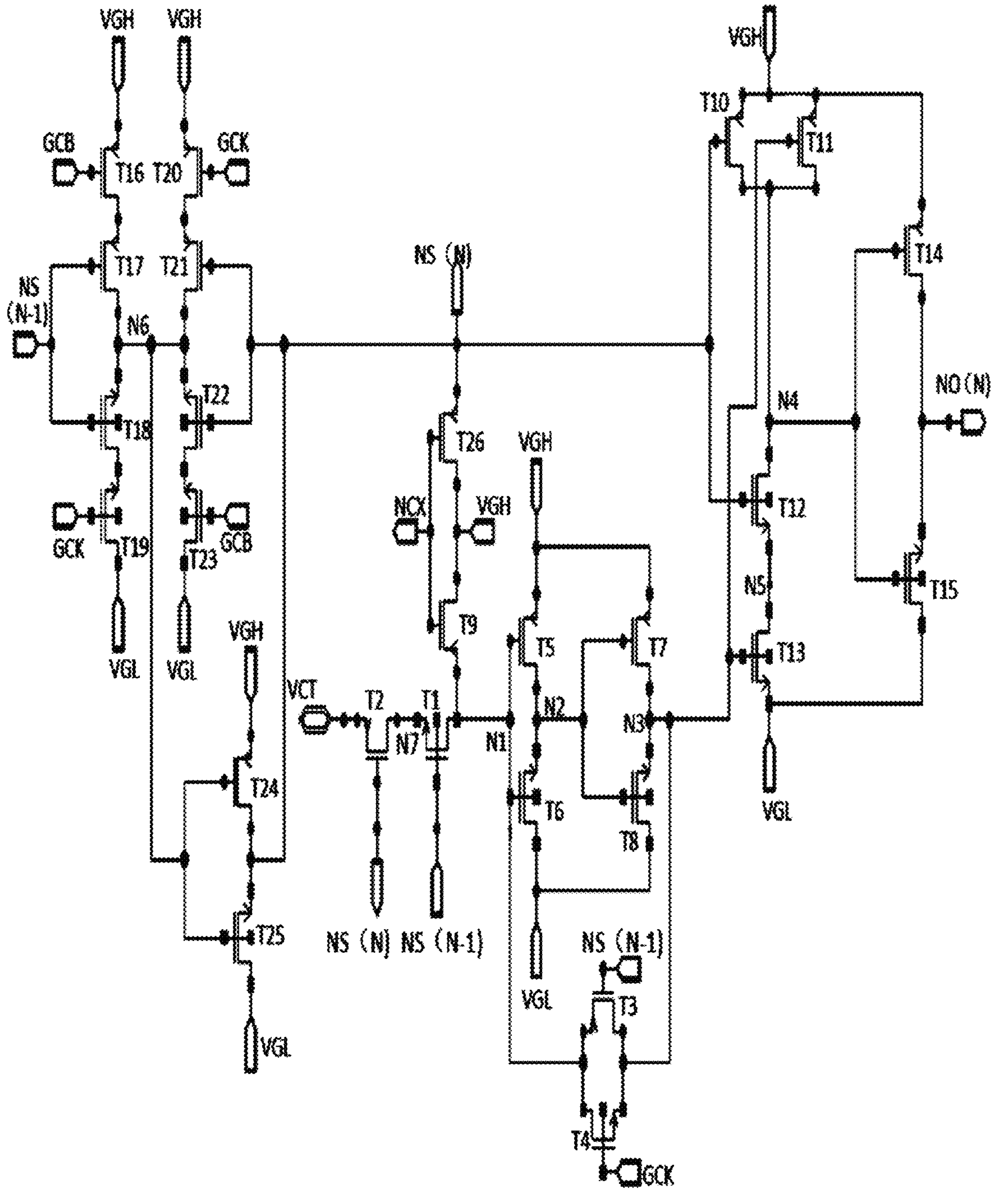
FIG. 23 is another circuit diagram of the driving circuitry according to one embodiment of the present disclosure.

As shown in FIG. 23, on the basis of the driving circuitry in FIG. 22, the driving circuitry further includes a second voltage maintenance circuitry, and the first node N1 is electrically coupled to the gate electrode of T11 through the second voltage maintenance circuitry. The second voltage maintenance circuitry includes a first phase inverter, a second phase inverter, and a maintenance control circuitry. The maintenance control circuitry includes a third transistor T3 and a fourth transistor T4. A gate electrode of the third transistor T3 is electrically coupled to the $(N-1)^{th}$-level driving signal output end NS (N−1), a source electrode of the third transistor T3 is electrically coupled to the first node N1, and a drain electrode of the third transistor T3 is electrically coupled to the third node N3. A gate electrode of the fourth transistor T4 is electrically coupled to the first clock signal end GCK, a source electrode of the fourth transistor T4 is electrically coupled to the third node N3, and a drain electrode of the fourth transistor T4 is electrically coupled to the first node N1.

The first phase inverter includes a fifth transistor T5 and a sixth transistor T6, and the second phase inverter includes a seventh transistor T7 and an eighth transistor T8. A gate electrode of the fifth transistor T5 is electrically coupled to the first node N1, a source electrode of the fifth transistor T5 is electrically coupled to the high voltage end VGH, and a drain electrode of the fifth transistor T5 is electrically coupled to the second node N2. A gate electrode of the sixth transistor T6 is electrically coupled to the first node N1, a source electrode of the sixth transistor T6 is electrically coupled to the second node N2, and a drain electrode of the sixth transistor T6 is electrically coupled to the low voltage end VGL. A gate electrode of the seventh transistor T7 is electrically coupled to the second node N2, a source electrode of the seventh transistor T7 is electrically coupled to the high voltage end VGH, and a drain electrode of the seventh transistor T7 is electrically coupled to the third node N3. A gate electrode of the eighth transistor T8 is electrically coupled to the second node N2, a source electrode of the eighth transistor T8 is electrically coupled to the third node N3, and a drain electrode of the eighth transistor T8 is electrically coupled to the low voltage end VGL. The third node N3 is electrically coupled to the gate electrode of T11 and the gate electrode of T13.

In the driving circuitry in FIG. 23, the third transistor T3 is a p-type transistor, the fourth transistor T4 is an n-type transistor, the fifth transistor T5 is a p-type transistor, the sixth transistor T6 is an n-type transistor, the seventh transistor T7 is a p-type transistor, and the eighth transistor T8 is an n-type transistor.

In the driving circuitry in FIG. 23, a threshold voltage drift occurs for the p-type transistor in the case of delivering a low voltage, and a threshold voltage drift occurs for the n-type transistor in the case of delivering a high voltage, so an absolute value of the potential at N1 is relative low. The absolute value of the potential at N1 is increased through the first phase inverter and the second phase inverter, so as to control the corresponding transistor in the output circuitry to be turned on or off in a better manner. When T1 and T2 are turned on, N1 is electrically decoupled from N3 under the control of the maintenance control circuitry, so it is able to prevent the writing of the potential at N1 from being adversely affected.

Figure 24:
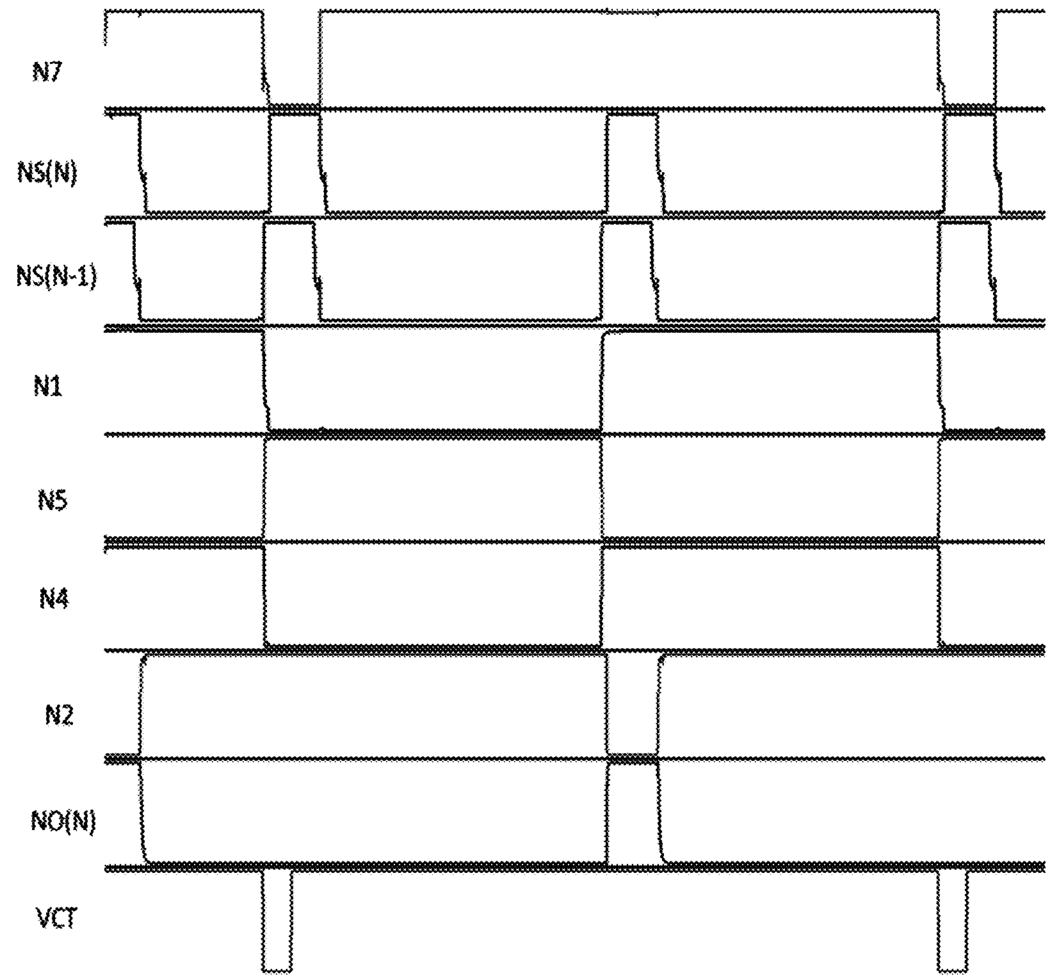
FIG. 24 is a sequence diagram of the driving circuitry in FIG. 23.

FIG. 24 is a sequence diagram of the driving circuitry in FIG. 23.

Figure 25:
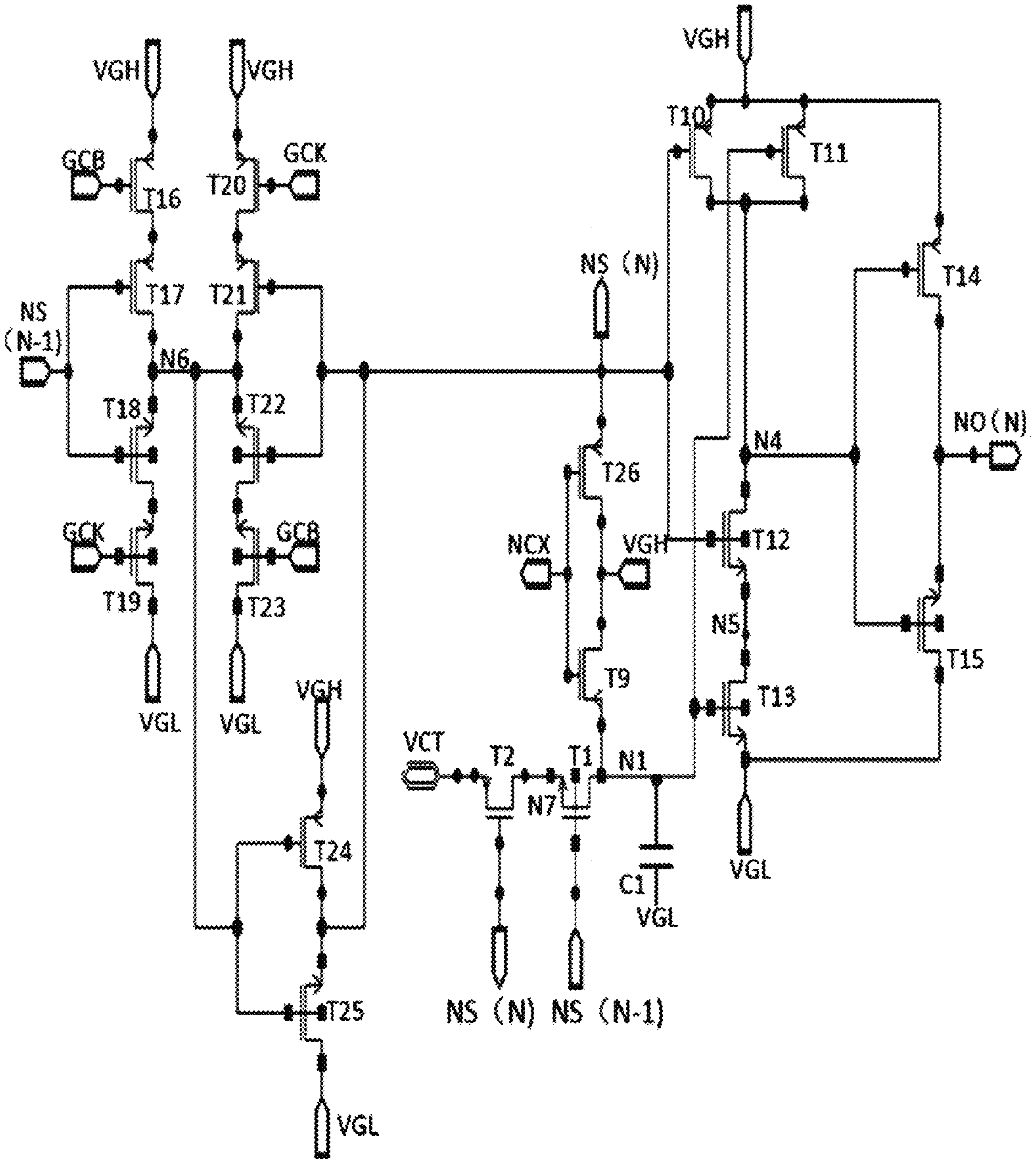
FIG. 25 is yet another circuit diagram of the driving circuitry according to one embodiment of the present disclosure.

The driving circuitry in FIG. 25 differs from that in FIG. 22 in that, the driving circuitry in FIG. 25 further includes the first capacitor C1, a first end of the first capacitor C1 is electrically coupled to the first node N1, and a second end of the first capacitor C1 is electrically coupled to the low voltage end VGL. C1 is configured to stabilize the potential at N1.

The present disclosure further provides in some embodiments a driving method for the above-mentioned driving circuitry, which includes: performing, by the driving signal generation circuitry, a shifting operation on an $(N-1)^{th}$-level driving signal to obtain and output an $N^{th}$-level driving signal through the $N^{th}$-level driving signal output end: writing, by the gating circuitry, a gating input signal from the gating input end into the first node under the control of a gating control signal: performing, by the output control circuitry, an NAND operation on the $N^{th}$-level driving signal and a potential at the second end of the output control circuitry to obtain a first output signal; and performing, by the output circuitry, phase inversion on the first output signal to obtain and provide an output driving signal through the output driving end.

The present disclosure further provides in some embodiments a driving module which includes multiple levels of the above-mentioned driving circuitries. An $N^{th}$-level driving circuitry is electrically coupled to a driving signal output end in an $(N-1)^{th}$-level driving circuitry, where N is a positive integer.

Figure 26:
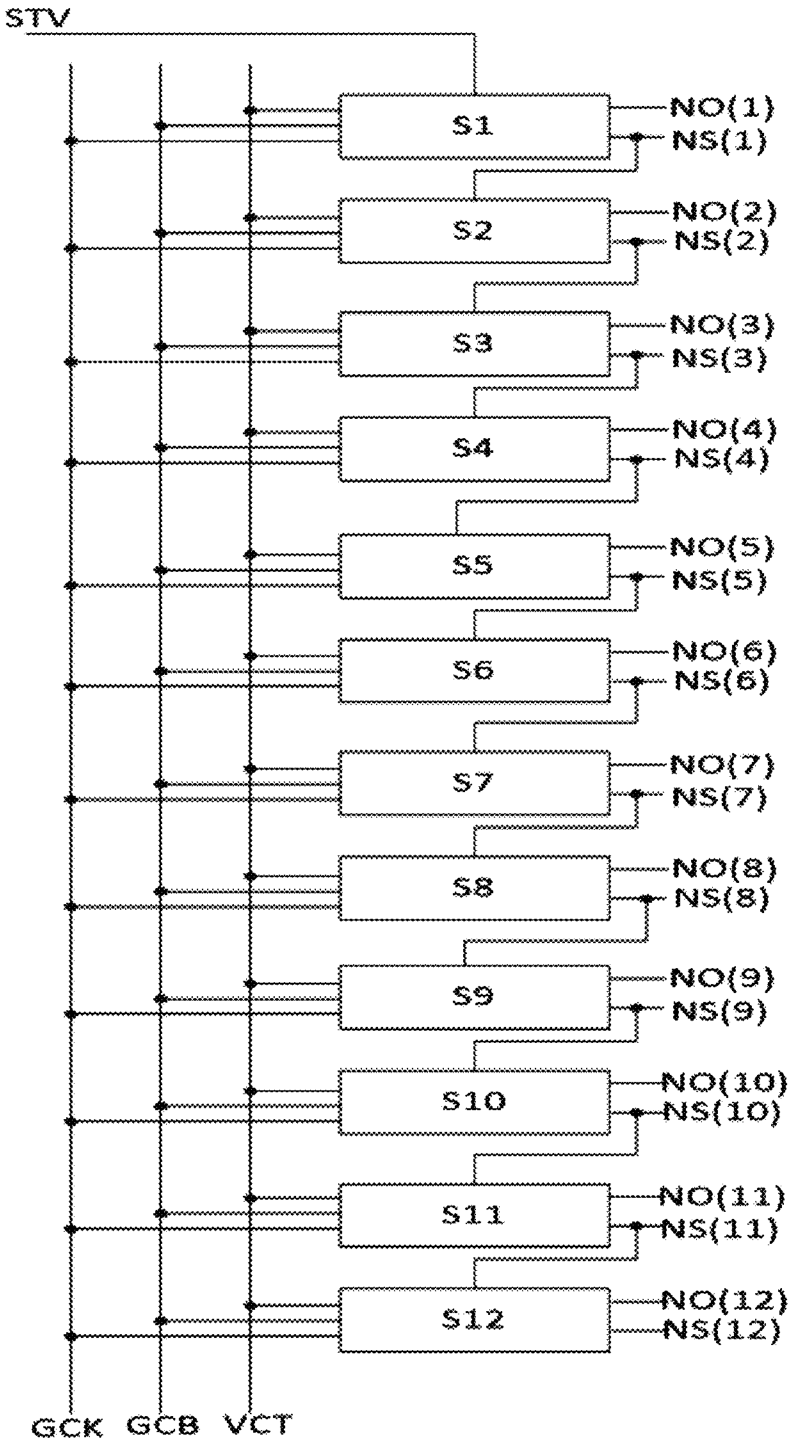
FIG. 26 is a schematic view showing a driving module according to one embodiment of the present disclosure.

As shown in FIG. 26, S1 is a first-level driving circuitry, S2 is a second-level driving circuitry, S3 is a third-level driving circuitry, S4 is a fourth-level driving circuitry, S5 is a fifth-level driving circuitry, S6 is a sixth-level driving circuitry, S7 is a seventh-level driving circuitry, S8 is an eighth-level driving circuitry, S9 is a ninth-level driving circuitry, 10 is a tenth-level driving circuitry, S11 is an eleventh-level driving circuitry, S12 is a twelfth-level driving circuitry, NS (1) is a driving signal output end of S1, NO (1) is an output driving end of S1, NS (2) is a driving signal output end of S2, NO (2) is an output driving end of S2, S2 is electrically coupled to NS (1), NS (3) is a driving signal output end of S3, NO (3) is an output driving end of S3, S3 is electrically coupled to NS (2), NS (4) is a driving signal output end of S4, NO (4) is an output driving end of S4, S4 is electrically coupled to NS (3), NS (5) is a driving signal output end of S5, NO (5) is an output driving end of S5, S5 is electrically coupled to NS (4), NS (6) is a driving signal output end of S6, NO (6) is an output driving end of S6, S6 is electrically coupled to NS (5), NS (7) is a driving signal output end of S7, NO (7) is an output driving end of S7, S7 is electrically coupled to NS (6), NS (8) is a driving signal output end of S8, NO (8) is an output driving end of S8, S8 is electrically coupled to NS (7), NS (9) is a driving signal output end of S9, NO (9) is an output driving end of S9, S9 is electrically coupled to NS (8), NS (10) is a driving signal output end of S10, NO (10) is an output driving end of S10, S10 is electrically coupled to NS (9), NS (11) is a driving signal output end of S11, NO (11) is an output driving end of S11, S11 is electrically coupled to NS (10), NS (12) is a driving signal output end of S12, NO (12) is an output driving end of S12, S12 is electrically coupled to NS (11), and S1, S2, S3, S4, S5, S6, S7, S8, S9, S10, S11 and S12 are all electrically coupled to the gating input end VCT, the first clock signal end GCK and the second clock signal end GCB.

In FIG. 26, STV is the start voltage end, and S1 is electrically coupled to STV.

Figure 27:
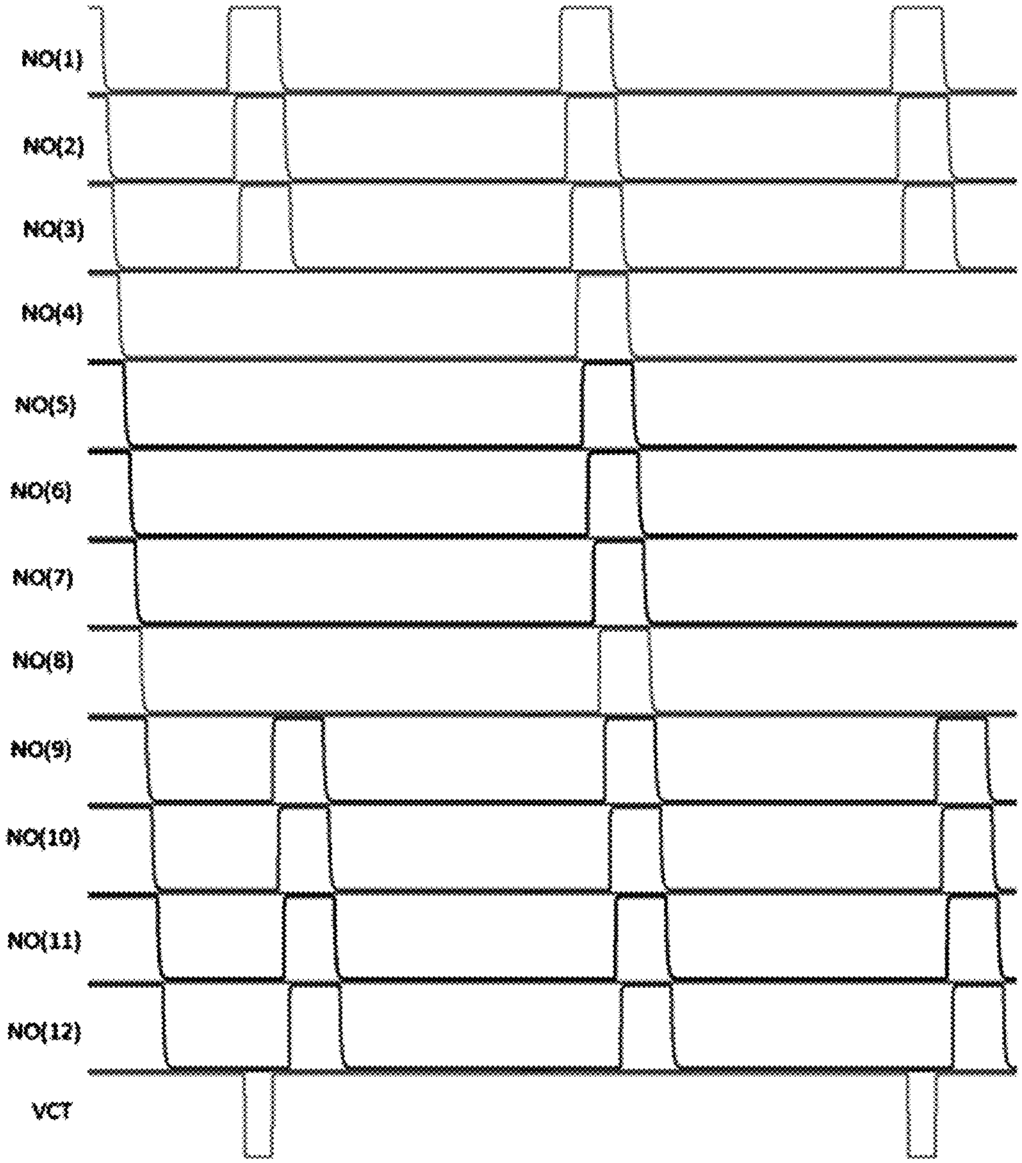
FIG. 27 is a sequence diagram of the driving module in FIG. 26.

FIG. 27 is a sequence diagram of the driving module in FIG. 26.

During the operation of the driving module in FIG. 26, NS (N−1) outputs a high voltage signal and NS (N) outputs a low voltage signal. In the case that VCT outputs a low voltage signal, NO (N) outputs a low voltage signal when NS (N) outputs a high voltage signal. In the case that VCT outputs a high voltage signal, NO (N) outputs a high voltage signal when NS (N) outputs a high voltage signal.

The present disclosure further provides in some embodiments a display device which includes the above-mentioned driving module.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A driving circuitry, comprising a driving signal generation circuitry, a gating circuitry, an output control circuitry, and an output circuitry, wherein the driving signal generation circuitry is electrically coupled to an $(N-1)^{th}$-level driving signal output end and an $N^{th}$-level driving signal output end, and configured to perform a shifting operation on an $(N-1)^{th}$-level driving signal from the $(N-1)^{th}$-level driving signal output end to obtain and output an $N^{th}$-level driving signal through the $N^{th}$-level driving signal output end;

the gating circuitry is electrically coupled to a first node, a gating input end, and a gating control end, and configured to write a gating input signal from the gating input end into the first node under the control of a gating control signal from the gating control end;

a first end of the output control circuitry is electrically coupled to the $N^{th}$-level driving signal output end, and a second end of the output control circuitry is electrically coupled to the first node, and the output control circuitry is configured to perform an NAND operation on the $N^{th}$-level driving signal and a potential at the second end of the output control circuitry to obtain a first output signal; and the output circuitry is configured to perform phase inversion on the first output signal to obtain and provide an output driving signal through an output driving end, where N is a positive integer.

2. The driving circuitry according to claim 1, further comprising a first initialization circuitry electrically coupled to an initial control end, a first voltage end, and the first node, and configured to control the first node to be electrically coupled to the first voltage end under the control of an initial control signal from the initial control end.

3. The driving circuitry according to claim 2, further comprising a first voltage maintenance circuitry, wherein a first end of the first voltage maintenance circuitry is electrically coupled to the first node, a second end of the first voltage maintenance circuitry is electrically coupled to a direct current voltage end or a second node, and the first voltage maintenance circuitry is configured to maintain a potential at the first node.

4. The driving circuitry according to claim 3, wherein the first initialization circuitry comprises a ninth transistor, and the first voltage maintenance circuitry comprises a first capacitor;

a gate electrode of the ninth transistor is electrically coupled to the initial control end, a first electrode of the ninth transistor is electrically coupled to the first voltage end, and a second electrode of the ninth transistor is electrically coupled to the first node; and a first end of the first capacitor is electrically coupled to the first node, and a second end of the first capacitor is electrically coupled to the direct current voltage end or the second node.

5. The driving circuitry according to claim 1, further comprising a second voltage maintenance circuitry, wherein the first node is electrically coupled to the second end of the output control circuitry through the second voltage maintenance circuitry;

the second voltage maintenance circuitry comprises a first phase inverter, a second phase inverter, and a maintenance control circuitry;

an input end of the first phase inverter is electrically coupled to the first node, an output end of the first phase inverter is electrically coupled to the second node, an input end of the second phase inverter is electrically coupled to the second node, and an output end of the second phase inverter is electrically coupled to a third node and the second end of the output control circuitry;

the first phase inverter is configured to perform phase inversion on the potential at the first node and output an inverted potential through the output end of the first phase inverter;

the second phase inverter is configured to perform phase inversion on a potential at the input end of the second phase inverter and output an inverted potential through the output end of the second phase inverter; and the maintenance control circuitry is electrically coupled to a maintenance control end, the third node, and the first node, and configured to control the third node to be electrically coupled to, or electrically decoupled from, the first node under the control of a maintenance control signal from the maintenance control end.

6. The driving circuitry according to claim 5, wherein the maintenance control end comprises a first maintenance control end and a second maintenance control end;

the maintenance control circuitry comprises a third transistor and a fourth transistor;

a gate electrode of the third transistor is electrically coupled to the first maintenance control end, a first electrode of the third transistor is electrically coupled to the first node, and a second electrode of the third transistor is electrically coupled to the third node;

a gate electrode of the fourth transistor is electrically coupled to and second maintenance control end, a first electrode of the fourth transistor is electrically coupled to the third node, and a second electrode of the fourth transistor is electrically coupled to the first node;

the third transistor is a p-type transistor, and the fourth transistor is an n-type transistor;

the first maintenance control end is the $(N-1)^{th}$-level driving signal end, and the second maintenance control end is a first clock signal end; or the first maintenance control end is a second clock signal end, and the second maintenance control end is the first clock signal end.

7. The driving circuitry according to claim 5, wherein the first phase inverter comprises a fifth transistor and a sixth transistor, and the second phase inverter comprises a seventh transistor and an eighth transistor;

a gate electrode of the fifth transistor is electrically coupled to the first node, a first electrode of the fifth transistor is electrically coupled to the first voltage end, and a second electrode of the fifth transistor is electrically coupled to the second node;

a gate electrode of the sixth transistor is electrically coupled to the first node, a first electrode of the sixth transistor is electrically coupled to the second node, and a second electrode of the sixth transistor is electrically coupled to a second voltage end;

the fifth transistor is a p-type transistor, and the sixth transistor is an n-type transistor;

a gate electrode of the seventh transistor is electrically coupled to the second node, a first electrode of the seventh transistor is electrically coupled to the first voltage end, and a second electrode of the seventh transistor is electrically coupled to a third node;

a gate electrode of the eighth transistor is electrically coupled to the second node, a first electrode of the eighth transistor is electrically coupled to the third node, and a second electrode of the eighth transistor is electrically coupled to the second voltage end; and the seventh transistor is a p-type transistor, and the eighth transistor is an n-type transistor.

8. The driving circuitry according to claim 5, wherein the output control circuitry comprises a tenth transistor, an eleventh transistor, a twelfth transistor, and a thirteenth transistor;

a gate electrode of the tenth transistor is electrically coupled to the $N^{th}$-level driving signal output end, a first electrode of the tenth transistor is electrically coupled to the first voltage end, and a second electrode of the tenth transistor is electrically coupled to a fourth node;

a gate electrode of the eleventh transistor is electrically coupled to the third node, a first electrode of the eleventh transistor is electrically coupled to the first voltage end, and a second electrode of the eleventh transistor is electrically coupled to the fourth node;

a gate electrode of the twelfth transistor is electrically coupled to the $N^{th}$-level driving signal output end, a first electrode of the twelfth transistor is electrically coupled to the fourth node, and a second electrode of the twelfth transistor is electrically coupled to a fifth node;

a gate electrode of the thirteenth transistor is electrically coupled to the third node, a first electrode of the thirteenth transistor is electrically coupled to the fifth node, and a second electrode of the thirteenth transistor is electrically coupled to the second voltage end; and the tenth transistor and the eleventh transistor are p-type transistors, and the twelfth transistor and the thirteenth transistor are n-type transistors.

9. The driving circuitry according to claim 1, wherein the driving signal generation circuitry comprises a first control circuitry, a second control circuitry, a third phase inverter, and a second initialization circuitry;

the first control circuitry is electrically coupled to a first clock signal end, a second clock signal end, the $(N-1)^{th}$-level driving signal output end, and a sixth node, and configured to perform a shifting operation and phase inversion on the $(N-1)^{th}$-level driving signal from the $(N-1)^{th}$-level driving signal output end under the control of a first clock signal from the first clock signal end and a second clock signal from the second clock signal end to obtain and output an inverted signal through the sixth node;

the second control circuitry is electrically coupled to the first clock signal end, the second clock signal end, the $N^{th}$-level driving signal output end, and the sixth node, and configured to perform phase inversion on the $N^{th}$-level driving signal from the $N^{th}$-level driving signal output end under the control of the first clock signal and the second clock signal to obtain and output an inverted signal through the sixth node;

the third phase inverter is electrically coupled to the sixth node and the $N^{th}$-level driving signal output end, and configured to perform phase inversion on a potential at the sixth node and output an inverted signal through the $N^{th}$-level driving signal output end; and the second initialization circuitry is electrically coupled to the initial control end, the first voltage end, and the $N^{th}$-level driving signal output end, and configured to control the $N^{th}$-level driving signal output end to be electrically coupled to the first voltage end under the control of the initial control signal from the initial control end.

10. The driving circuitry according to claim 9, wherein the first control circuitry comprises a sixteenth transistor, a seventeenth transistor, an eighteenth transistor, and a nineteenth transistor;

a gate electrode of the sixteenth transistor is electrically coupled to the second clock signal end, a first electrode of the sixteenth transistor is electrically coupled to the first voltage end, and a second electrode of the sixteenth transistor is electrically coupled to a first electrode of the seventeenth transistor;

a gate electrode of the seventeenth transistor is electrically coupled to the $(N-1)^{th}$-level driving signal output end, and a second electrode of the seventeenth transistor is electrically coupled to the sixth node;

a gate electrode of the eighteenth transistor is electrically coupled to the $(N-1)^{th}$-level driving signal output end, a first electrode of the eighteenth transistor is electrically coupled to the sixth node, and a second electrode of the eighteenth transistor is electrically coupled to a first electrode of the nineteenth transistor;

a gate electrode of the nineteenth transistor is electrically coupled to the first clock signal end, and a second electrode of the nineteenth transistor is electrically coupled to the second voltage end; and the sixteenth transistor and the seventeenth transistor are p-type transistors, and the eighteenth transistor and the nineteenth transistor are n-type transistors.

11. The driving circuitry according to claim 9, wherein the second control circuitry comprises a twentieth transistor, a twenty-first transistor, a twenty-second transistor, and a twenty-third transistor;

a gate electrode of the twentieth transistor is electrically coupled to the first clock signal end, a first electrode of the twentieth transistor is electrically coupled to the first voltage end, and a second electrode of the twentieth transistor is electrically coupled to a first electrode of the twenty-first transistor;

a gate electrode of the twenty-first transistor is electrically coupled to the $N^{th}$-level driving signal output end, and a second electrode of the twenty-first transistor is electrically coupled to the sixth node;

a gate electrode of the twenty-second transistor is electrically coupled to the $N^{th}$-level driving signal output end, a first electrode of the twenty-second transistor is electrically coupled to the sixth node, and a second electrode of the twenty-second transistor is electrically coupled to a first electrode of the twenty-third transistor;

a gate electrode of the twenty-third transistor is electrically coupled to the second clock signal end, and a second electrode of the twenty-third transistor is electrically coupled to the second voltage end; and the twentieth transistor and the twenty-first transistor are p-type transistors, and the twenty-second transistor and the twenty-third transistor are n-type transistors.

12. The driving circuitry according to claim 9, wherein the third phase inverter comprises a twenty-fourth transistor and a twenty-fifth transistor, and the second initialization circuitry comprises a twenty-sixth transistor;

a gate electrode of the twenty-fourth transistor is electrically coupled to the sixth node, a first electrode of the twenty-fourth transistor is electrically coupled to the first voltage end, and a second electrode of the twenty-fourth transistor is electrically coupled to a first electrode of the twenty-fifth transistor;

a gate electrode of the twenty-fifth transistor is electrically coupled to the sixth node, and a second electrode of the twenty-fifth transistor is electrically coupled to the second voltage end;

the twenty-fourth transistor is a p-type transistor, and the twenty-fifth transistor is an n-type transistor; and a gate electrode of the twenty-sixth transistor is electrically coupled to the initial control end, a first electrode of the twenty-sixth transistor is electrically coupled to the first voltage end, and a second electrode of the twenty-sixth transistor is electrically coupled to the $N^{th}$-level driving signal output end.

13. A driving module, comprising multiple levels of the driving circuitries according to claim 1, wherein an $N^{th}$-level driving circuitry is electrically coupled to a driving signal output end in an $(N-1)^{th}$-level driving circuitry, where N is a positive integer.

14. A display device, comprising the driving module according to claim 13.

15. The driving circuitry according to claim 1, wherein the gating circuitry is configured to control to write the gating input signal from the gating input end into the first node when a potential of the $(N-1)^{th}$-level driving signal is a first voltage and a potential of the $N^{th}$-level driving signal is a second voltage.

16. The driving circuitry according to claim 1, wherein the gating circuitry comprises a first transistor, a gate electrode of the first transistor is electrically coupled to the gating control end, a first electrode of the first transistor is electrically coupled to the first node, and a second electrode of the first transistor is electrically coupled to the gating input end.

17. The driving circuitry according to claim 1, wherein the gating control end comprises a first gating control end and a second gating control end, and the gating circuitry comprises a first transistor and a second transistor;

a gate electrode of the first transistor is electrically coupled to the first gating control end, a first electrode of the first transistor is electrically coupled to the first node, and a second electrode of the first transistor is electrically coupled to a first electrode of the second transistor;

a gate electrode of the second transistor is electrically coupled to the second gating control end, and a second electrode of the second transistor is electrically coupled to the gating input end;

the first gating control end is the $(N-1)^{th}$-level driving signal output end, the second gating control end is the $N^{th}$-level driving signal output end, the first transistor is an n-type transistor, and the second transistor is a p-type transistor; or the first gating control end is the $N^{th}$-level driving signal output end, the second gating control end is the $(N-1)^{th}$-level driving signal output end, the first transistor is a p-type transistor, and the second transistor is an n-type transistor; or the first gating control end is configured to receive an inverted signal of the $(N-1)^{th}$-level driving signal, the second gating control end is the $N^{th}$-level driving signal output end, and the first transistor and the second transistor are both p-type transistors; or the first gating control end is the $N^{th}$-level driving signal output end, and the second gating control end is configured to receive the inverted signal of the $(N-1)^{th}$-level driving signal, and the first transistor and the second transistor are both p-type transistors; or the first gating control end is an $(N-1)^{th}$-level driving signal end, the second gating control end is configured to receive an inverted signal of the $N^{th}$-level driving signal, and the first transistor and the second transistor are both n-type transistors; or the first gating control end is configured to receive the inverted signal of the $N^{th}$-level driving signal, the second gating control end is the $(N-1)^{th}$-level driving signal end, and the first transistor and the second transistor are both n-type transistors.

18. The driving circuitry according to claim 1, wherein the output control circuitry comprises a tenth transistor, an eleventh transistor, a twelfth transistor, and a thirteenth transistor;

a gate electrode of the tenth transistor is electrically coupled to the $N^{th}$-level driving signal output end, a first electrode of the tenth transistor is electrically coupled to the first voltage end, and a second electrode of the tenth transistor is electrically coupled to a fourth node;

a gate electrode of the eleventh transistor is electrically coupled to the first node, a first electrode of the eleventh transistor is electrically coupled to the first voltage end, and a second electrode of the eleventh transistor is electrically coupled to the fourth node;

a gate electrode of the twelfth transistor is electrically coupled to the $N^{th}$-level driving signal output end, a first electrode of the twelfth transistor is electrically coupled to the fourth node, and a second electrode of the twelfth transistor is electrically coupled to a fifth node;

a gate electrode of the thirteenth transistor is electrically coupled to the first node, a first electrode of the thirteenth transistor is electrically coupled to the fifth node, and a second electrode of the thirteenth transistor is electrically coupled to and second voltage end; and the tenth transistor and the eleventh transistor are p-type transistors, and the twelfth transistor and the thirteenth transistor are n-type transistors.

19. The driving circuitry according to claim 1, wherein the output circuitry comprises a fourteenth transistor and a fifteenth transistor;

a gate electrode of the fourteenth transistor is electrically coupled to a fourth node, a first electrode of the fourteenth transistor is electrically coupled to the first voltage end, and a second electrode of the fourteenth transistor is electrically coupled to the output driving end; and a gate electrode of the fifteenth transistor is electrically coupled to the fourth node, a first electrode of the fifteenth transistor is electrically coupled to the output driving end, and a second electrode of the fifteenth transistor is electrically coupled to the second voltage end.

20. A driving method for the driving circuitry according to claim 1, comprising:

performing, by the driving signal generation circuitry, a shifting operation on an $(N-1)^{th}$-level driving signal to obtain and output an $N^{th}$-level driving signal through the $N^{th}$-level driving signal output end;

writing, by the gating circuitry, a gating input signal from the gating input end into the first node under the control of a gating control signal;

performing, by the output control circuitry, an NAND operation on the $N^{th}$-level driving signal and a potential at the second end of the output control circuitry to obtain a first output signal; and performing, by the output circuitry, phase inversion on the first output signal to obtain and provide an output driving signal through the output driving end.

* * * * *